US010284343B2

(12) United States Patent
Somichetty et al.

(10) Patent No.: US 10,284,343 B2
(45) Date of Patent: May 7, 2019

(54) FREQUENCY HOPPING FOR MULTICAST SERVICE TRANSMISSIONS FOR NARROWBAND DEVICES

(71) Applicant: QUALCOMM Incorporated, San Diego, CA (US)

(72) Inventors: Gowrisankar Somichetty, Bangalore (IN); Kapil Bhattad, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/655,577

(22) Filed: Jul. 20, 2017

(65) Prior Publication Data
US 2018/0131483 A1 May 10, 2018

(30) Foreign Application Priority Data
Nov. 4, 2016 (IN) .............................. 201641037770

(51) Int. Cl.
H04L 5/00 (2006.01)
H04W 72/00 (2009.01)
H04B 1/713 (2011.01)

(52) U.S. Cl.
CPC .......... H04L 5/0012 (2013.01); H04B 1/713 (2013.01); H04L 5/0094 (2013.01); H04W 72/005 (2013.01)

(58) Field of Classification Search
CPC .. H04L 5/0012; H04L 5/0094; H04W 72/005; H04B 1/713
USPC ......................................................... 375/260
See application file for complete search history.

(56) References Cited

U.S. PATENT DOCUMENTS 7,281,058 B1 * 10/2007 Shepherd ............ H04L 12/1836
709/227

FOREIGN PATENT DOCUMENTS

WO 2014025228 A1 2/2014
WO 2016129959 A1 8/2016

OTHER PUBLICATIONS

International Search Report and Written Opinion—PCT/US2017/052291—ISA/EPO—dated Jan. 18, 2018.

* cited by examiner

Primary Examiner — Michael R Neff
(74) Attorney, Agent, or Firm — Nerrie M. Zohn

(57) ABSTRACT

Various features related to frequency hopping for broadcast/multicast transmissions for narrow band devices are described. To exploit frequency diversity, multicast transmissions may be frequency hopped. In an aspect, a UE maybe configured to receive a signal, e.g., from a base station, including at least one of a first hopping indicator indicating whether frequency hopping is enabled for a multicast control channel or a second hopping indicator indicating whether frequency hopping is enabled for a multicast traffic channel, and determine whether frequency hopping is enabled for the at least one of the multicast control or traffic channel based on the received signal. The UE may further determine at least one hopping pattern for receiving multicast transmissions in the at least one of the multicast control channel or the multicast traffic channel when the frequency hopping is enabled, and receive the multicast transmissions based on the determined at least one hopping pattern.

23 Claims, 13 Drawing Sheets

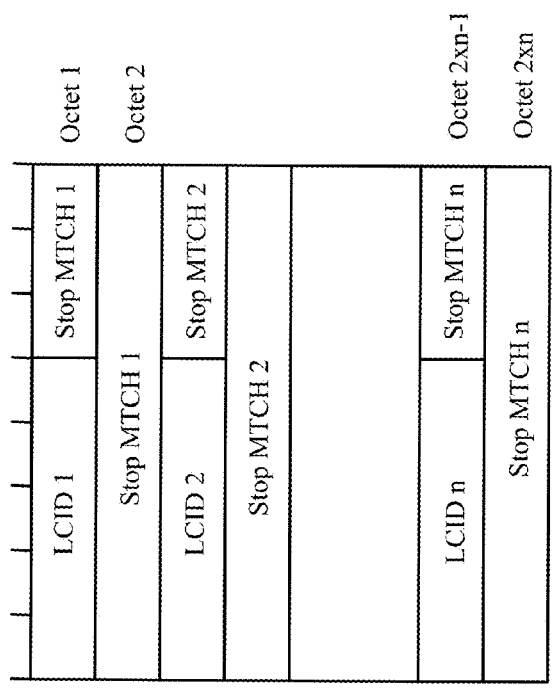
FIG. 4C
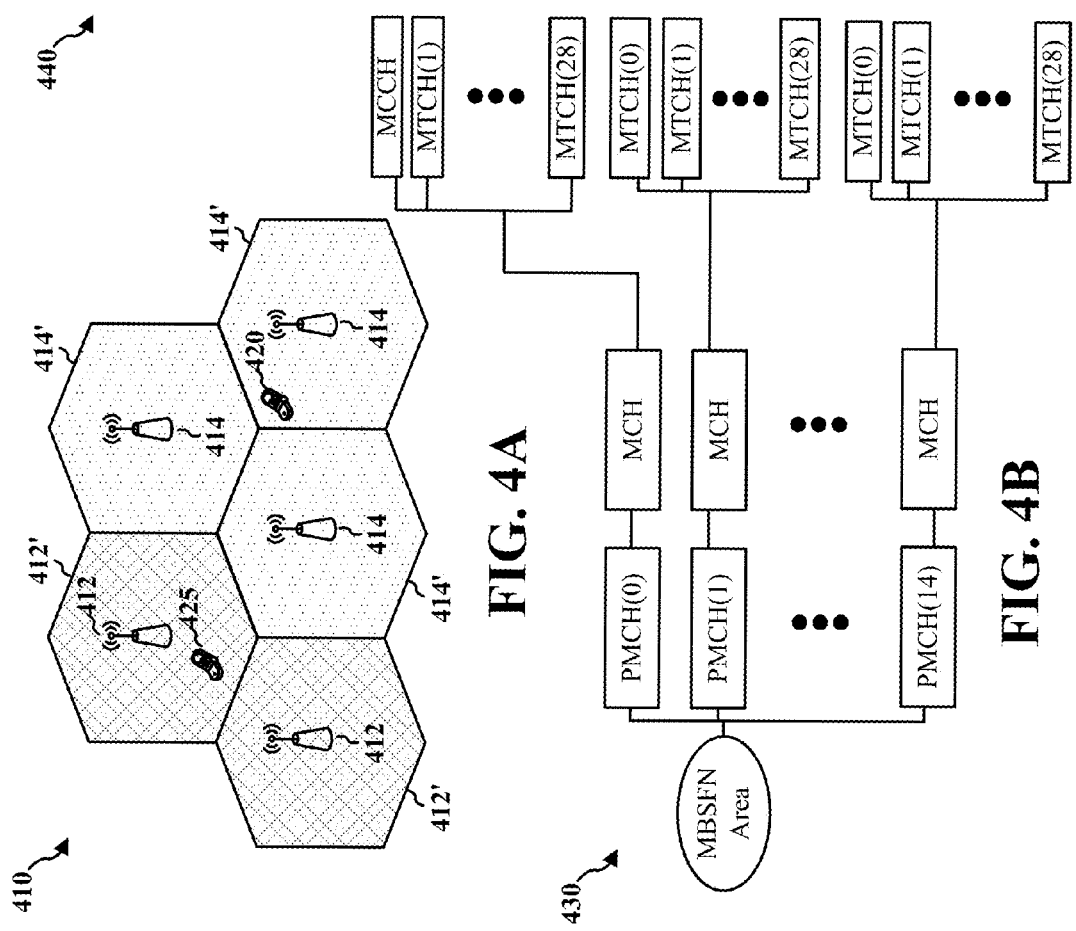
FIG. 4A
FIG. 4B

FREQUENCY HOPPING FOR MULTICAST SERVICE TRANSMISSIONS FOR NARROWBAND DEVICES

CROSS-REFERENCE TO RELATED APPLICATION(S)

This application claims the benefit of Indian Application Serial No. 201641037770, entitled "FREQUENCY HOPPING FOR MULTICAST TRANSMISSIONS FOR NARROWBAND DEVICES" filed on Nov. 4, 2016, which is expressly incorporated by reference herein in its entirety.

BACKGROUND

Field

The present disclosure relates generally to communication systems, and more particularly, to methods and apparatus for frequency hopping for multicast transmissions for narrow band devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Techniques for efficient narrowband wireless communication are desirable and needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Many devices that utilize narrow bands (NBs) for communication, such as enhanced Machine Type Communication (eMTC) and/or Narrow Band Internet of Things (NB-IOT) devices, may receive on a particular narrow band in a subframe. When such devices are interested in receiving multicast services, e.g., via multicast transmissions, then the devices may need to wake up on specific set of sub-frames where the multicast data is transmitted. The multicast transmissions may include multicast transmissions in a multicast control channel (MCCH) and a multicast traffic channel (MTCH). In some configurations, the multicast transmissions include single-cell point-to-multipoint (SC-PTM) transmissions. In order to exploit frequency diversity, the multicast transmissions in NBs can be hopped across the subframes.

Various features related to methods and apparatus for frequency hopping for broadcast/multicast service related transmissions for narrow band devices, e.g., further enhanced Machine Type Communication (FeMTC) devices and/or IOT type devices, are described. In some configurations, a hopping pattern used for the multicast service related transmissions in the multicast control and traffic channels may be determined using pre-configured hopping parameters. In some configurations, the hopping parameters may include any of: a hopping enable flag, a hopping offset, number of narrow bands to hop, and hopping duration.

To take advantage of frequency diversity, the multicast transmissions, e.g., SC-PTM transmissions such as single-cell multicast control channel (SC-MCCH) transmissions and single-cell multicast traffic channel (SC-MTCH) transmissions, may be hopped across frequencies. Thus, in accordance with an aspect, to advantageously exploit frequency diversity, multicast service related transmissions on narrow band frequencies (e.g., corresponding to multicast control and traffic channels) may be hopped across subframes. Various embodiments describe different options for configuring hopping patterns for multicast control and traffic channels. In some configurations, the hopping parameters for multicast transmissions can be determined from cell specific hopping parameters received in a system information block (SIB). In some other configurations, the hopping parameters for multicast transmissions in the MCCH and the MTCH may be configured independently and communicated to the devices interested in receiving the multicast services via separate signaling from the network. In accordance with an aspect, frequency hopping activation for multicast control channels and multicast traffic channels may be independently configured and signaled to devices. Thus the network may configure independent and separate indicators to signal the devices interested in receiving multicast services whether frequency hopping is enabled for a multicast control channels and multicast traffic channels.

In some aspects, same set of hopping parameters can be used for all multicast transmissions, e.g., same hopping parameters for all multicast transmission in the multicast control channels and multicast traffic channels. Accordingly, in some aspects, a device, e.g., a user equipment (UE), may determine and use the same, e.g., one single hopping pattern, for receiving both the multicast transmissions in the multicast control channels, e.g., such as such SC-MCCH transmissions. and multicast transmissions in the multicast traffic channels, such as SC-MTCH multicast transmissions. In some other configurations, one set of parameters for all multicast transmissions in the multicast control channels may be used while another set, e.g., a different set, of parameters may be used for all multicast transmissions in the multicast traffic channels.

In an aspect of the disclosure, a method, a computer-readable medium, and an apparatus are provided. The apparatus, e.g., a UE, may be configured to receive a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. The apparatus may be further configured to determine whether frequency hopping is enabled for the at least one of the multicast control channel or the multicast traffic channel based on the received signal.

In another aspect of the disclosure, a method, a computer-readable medium, and an apparatus are provided. The apparatus may be a base station configured to transmit a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. The apparatus may be further configured to transmit multicast transmissions in the at least one of the multicast control channel or the multicast traffic channel based on at least one hopping pattern when the frequency hopping is enabled for the at least one of the multicast control channel or the multicast traffic channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating an example of Multicast Broadcast Single Frequency Network areas in an access network.

FIG. 4B is a diagram illustrating an example of an evolved Multimedia Broadcast Multicast Service channel configuration in a Multicast Broadcast Single Frequency Network.

FIG. 4C is a diagram illustrating a format of a Multicast Channel (MCH) Scheduling Information (MSI) Medium Access Control element.

DETAILED DESCRIPTION

Figure 1:
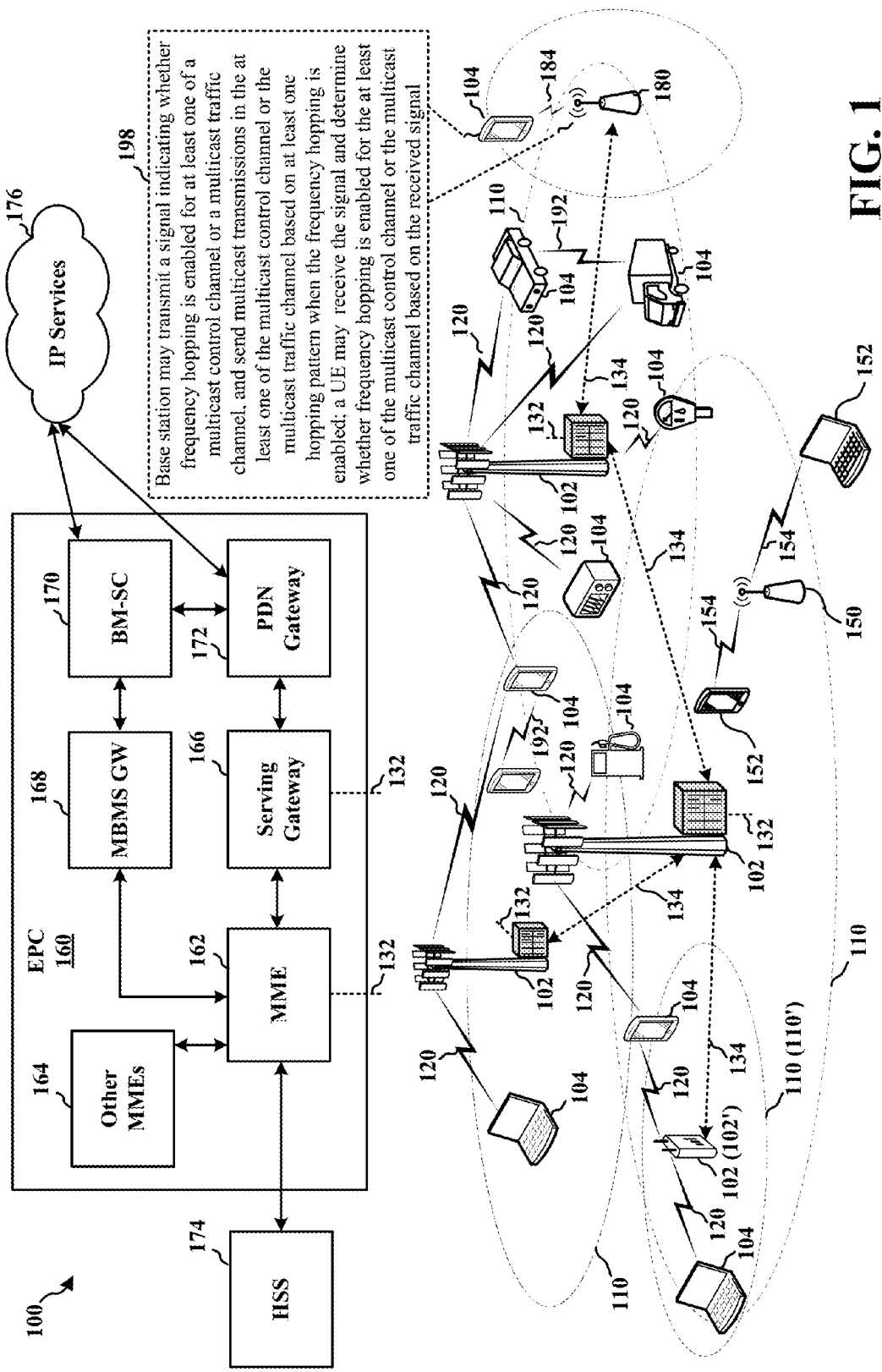
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station (e.g., gNB 180) may transmit (198) a signal indicating whether frequency hopping is enabled for at least one of a multicast control channel or a multicast traffic channel, and transmit multicast transmissions in the at least one of the multicast control channel or the multicast traffic channel based on at least one hopping pattern when the frequency hopping is enabled for the at least one of the multicast control channel or the multicast traffic channel. The transmitted signal may include at least one of a first hopping indicator indicating whether frequency hopping is enabled for the multicast control channel or a second hopping indicator indicating whether frequency hopping is enabled for the multicast traffic channel. Furthermore, in an aspect the UE 104 may be configured to receive (198) the signal indicating whether frequency hopping is enabled for the at least one of the multicast control channel or the multicast traffic channel, and determine whether frequency hopping is enabled for the at least one of the multicast control channel or the multicast traffic channel based on the received signal. Various additional features in this context are discussed in more detail infra.

Figure 2:
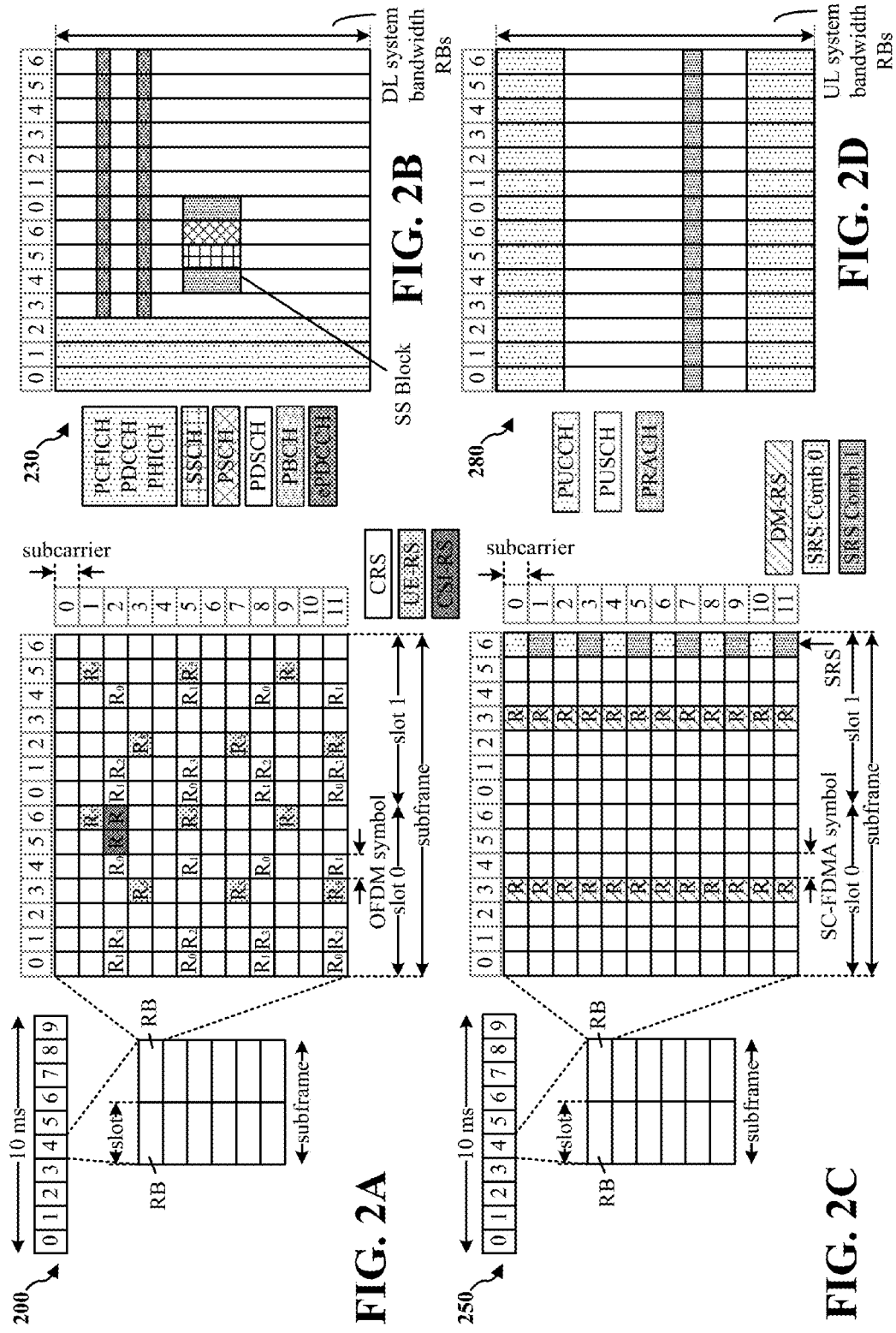
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
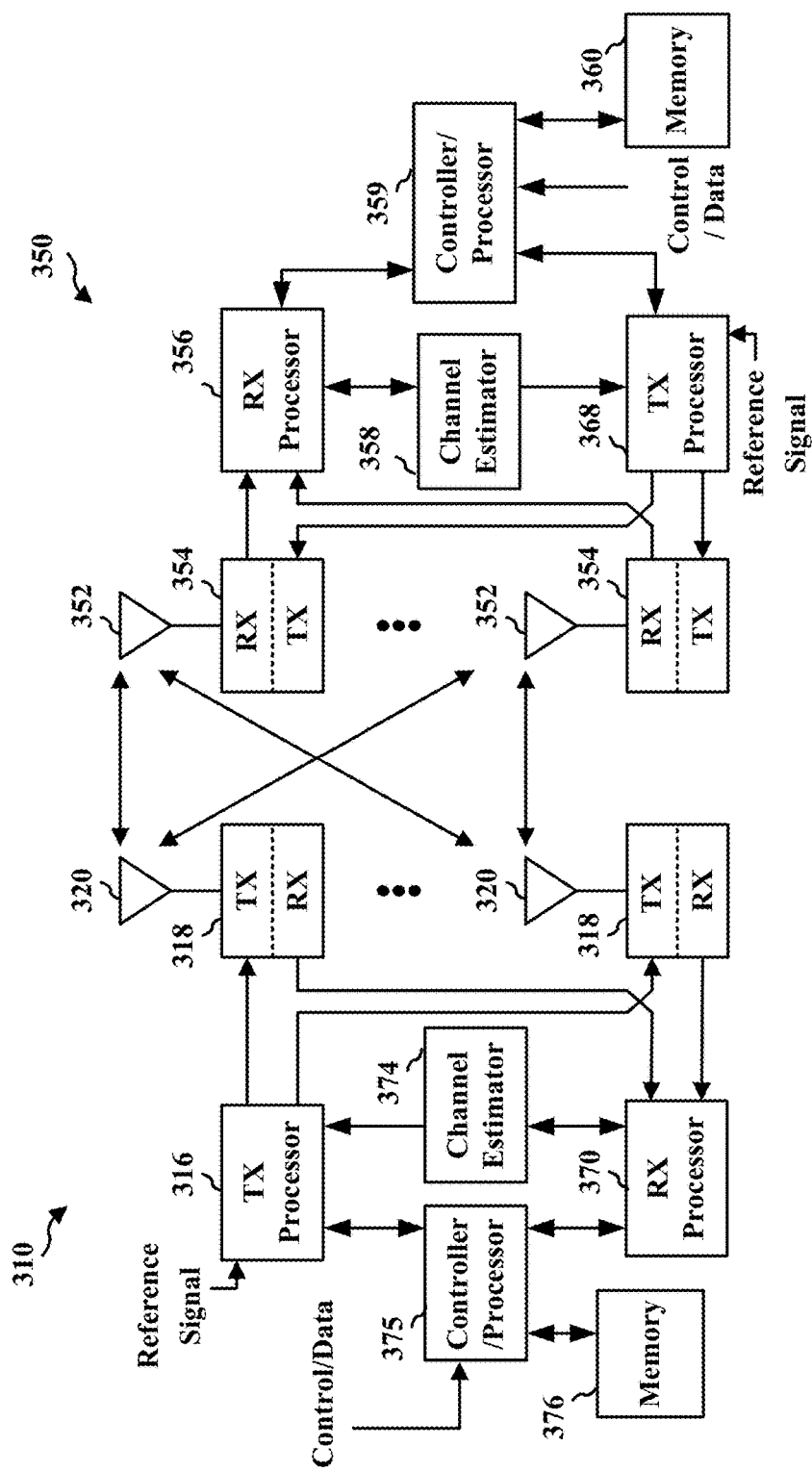
FIG. 3 is a diagram illustrating an example of an evolved Node B (eNB) and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, ..., 256 frames), an MCCH offset (e.g., 0, 1, ..., 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, ..., 256 frames) of the allocated resources for all the PMCHs in the area, and (3) an MCH scheduling period (MSP) (e.g., 8, 16, 32, ..., or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, ..., LCID n) may indicate a logical channel identifier of the MTCH. A Stop MTCH field (e.g., Stop MTCH 1, Stop MTCH 2, ..., Stop MTCH n) may indicate the last subframe carrying the MTCH corresponding to the particular LCID.

Recently there has been an increased interest in supporting multicast transmissions, e.g., SC-PTM transmissions, for FeMTC and NB-IOT type devices. Such devices interested in receiving multicast services via multicast transmissions may need to wake up on a specific set of NBs (e.g., comprising multicast channels) in a set of subframes where the multicast data corresponding to multicast services is transmitted. The multicast transmissions may be communicated through certain multicast channels. For example, an MCCH carries the information of available multicast services and the scheduling information of each of the available multicast services while the actual traffic payload of each multicast service may be communicated via an MTCH. The multicast services may include multimedia broadcasts, audio/video content files, software (SW) updates etc. In some configurations, the MCCH and MTCH may be part of the PDSCH or Machine Type Communication PDCCH (MPDCCH). If the PDSCH/MPDCCH are repeated across subframes then the multicast channels carrying the multicast control and traffic transmissions may be frequency hopped across the subframes.

In some configurations, the multicast transmissions include SC-PTM transmissions. In order to exploit frequency diversity, the SC-PTM transmissions, e.g., multicast transmissions in the SC-MCCHs and SC-MTCHs, may be hopped across a set of NBs in a set of subframes in some configurations. That is, the SC-MCCHs and SC-MTCHs may be frequency hopped. The frequency hopping may be implemented by using one or more hopping patterns, which may be configured in a variety of ways. In accordance with an aspect, when frequency hopping is performed, the network (e.g., a base station) may inform the devices, e.g., UEs, that frequency hopping is enabled for one or more types of multicast channels so that the UEs may determine a hopping pattern(s) for receiving the multicast transmissions in the hopped multicast channels based on the determined hopping pattern. A hopping pattern for a multicast channel may be based on a set of hopping parameters configured by the network. The hopping parameters may include a hopping enable flag, a hopping offset, number of narrow bands to hop, and a hopping duration. In some configurations, the hopping parameters for multicast channel hopping may be independently configured by the network and the base station may communicate the hopping parameter configuration information to the UEs using RRC signaling. In some other configurations, the hopping parameters for multicast channel hopping may be the same or based on the hopping parameters defined in a SIB. In such a case, there may be no specific RRC signaling from the base station to communicate the hopping parameters but rather the UEs may be configured to determine a cell specific hopping pattern based on the hopping parameters defined in a SIB and use the cell specific hopping pattern to receive the multicast transmissions in the multicast channels. In such a case, the multicast channels may be hopped based on the cell specific hopping pattern which is also used as the hopping pattern for one or more SIBs and/or other channels.

The hopping parameters for multicast channel hopping may be configured by the network in a variety of ways. For example, in some configurations, the same set of hopping parameters (and therefore the same hopping pattern) may be used for all multicast control channels and all multicast traffic channels. Accordingly, in some configurations, a UE may determine and use the same, e.g., one single hopping pattern, for receiving both the multicast transmissions in the multicast control channels and multicast traffic channels.

In another configuration, one set of hopping parameters may be used for all multicast control channels while another set, e.g., a different set, of hopping parameters may be used for all the multicast traffic channels.

In some other configurations, one set of parameters may be used for all multicast control channels, e.g., one hopping pattern for all multicast control channels, and a different set of parameters may be used for each different multicast traffic channel in a plurality of multicast traffic channels. Thus, in such a case, a first hopping pattern may be used for all multicast control channels, while a different hopping pattern may be used for each different multicast traffic channel.

In accordance with yet another configuration, each multicast control channel may be configured with its own hopping pattern and each multicast traffic channel (corresponding to a set of services) may be configured with its own hopping pattern. In such a configuration, the multicast transmissions in each multicast control channel may be received by a device based on one of a first plurality of hopping patterns for the multicast control channels, and the multicast transmissions in each multicast traffic channel may be received based on one of a second plurality of different hopping patterns for the multicast traffic channels.

In another aspect, some hopping parameters may be based on the existing hopping parameters (e.g., as defined in a SIB for a cell specific hopping pattern), while the remaining parameters can be configured independently. For example, the hopping enable flag alone may be independently configured and signaled to the UEs, while other hopping parameters may be derived by the UEs from information received in a SIB. In such a configuration, the base station may signal the UEs to indicate whether hopping is enabled for a multicast control channel and for a multicast traffic channel. When hopping is enabled, the UE may determine the hopping pattern of the multicast control channel and the multicast traffic channel (for receiving the multicast transmissions in the multicast control and traffic channel) based on the hopping parameters received in a SIB.

In an aspect, a multicast control channel that may carry control information about various multicast services may be associated with a plurality of multicast traffic channels that may carry traffic payload for the multicast services. Whether or not hopping is enabled may be indicated by a single bit, in one example. In some configurations, a single bit indicator may be used to indicate whether hopping is enabled for the multicast control channel. A single bit hopping indicator may be used for each of the plurality of multicast traffic channels, where each single bit hopping indicator may indicate whether hopping is enabled for a corresponding multicast traffic channel in the plurality of multicast traffic channels.

Figure 5:
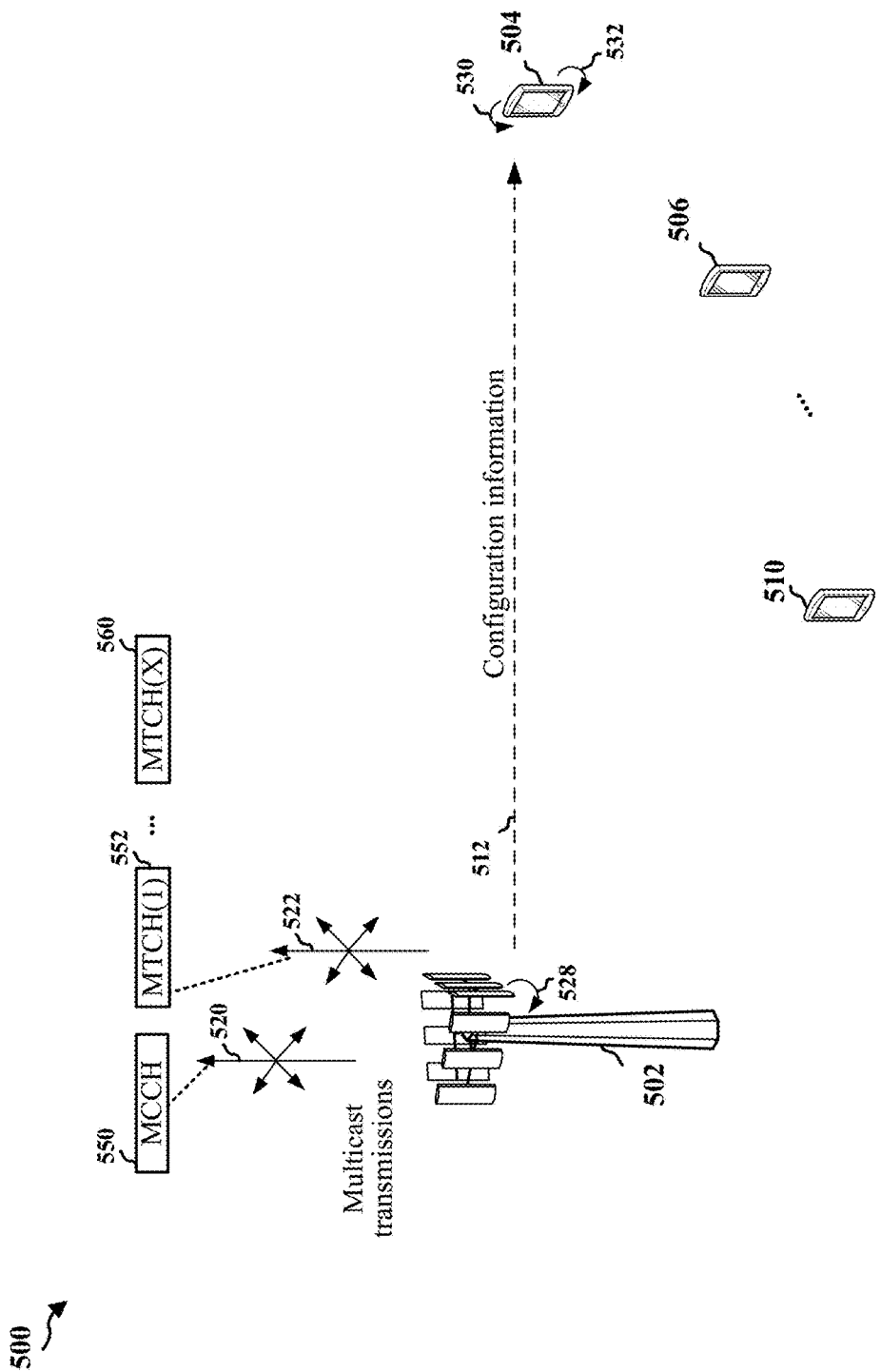
FIG. 5 illustrate an example communications system and signaling between devices in accordance with an example configuration.

FIG. 5 illustrates an example communications system 500 and signaling between devices in accordance with an example embodiment. The example communications system 500 may be a part of the system and access network of FIG. 1. The communications system 500 includes a base station (e.g., eNB/gNB) 502 and a plurality of UEs including UE 504, UE 506, . . . , and UE 510. The base station 502 may correspond to the base station 180 and the UEs 504, 506, . . . , 510 may correspond to UE 104 of FIG. 1. In accordance with one aspect, the system 500 may support multicast service related transmissions, e.g., SC-MCCH transmissions and/or SC-MTCH transmissions, etc., from the base station 502 and the UEs 504, 506, . . . , 510. In some aspects, the devices shown in system 500 may support NB-IOT communication and eMTC/FeMTC. Thus, in some aspects, at least some of the UEs 504, UE 506, . . . , and UE 510 are eMTC and/or NB-IOT type devices. Various aspects related to the example methods which may be used in the communication system 500 are discussed below.

In order to advantageously exploit frequency diversity, multicast service related transmissions may be hopped across frequencies, e.g., NBs in a set of subframes. The multicast service transmissions may include, for example, SC-PTM transmissions such as SC-MCCH transmissions carried by a SC-MCCH and SC-MTCH transmissions carried by SC-MTCHs. Thus in some configurations, the multicast control channels (e.g., SC-MCCH) and/or multicast traffic channels (e.g., SC-MTCH) may be frequency hopped. In accordance with an aspect, when frequency hopping is used for multicast transmissions, the base station 502 may inform one or more of the UEs 504, 506, . . . , 510 that frequency hopping is enabled for one or more types of multicast channels. In some configurations, the base station 502 may inform the UEs 504, 506, . . . , 510 whether frequency hopping is used for multicast control and traffic channels via hopping activation indicators to indicate whether frequency hopping is active or inactive (e.g., ON/OFF). For example, in an aspect, the base station 502 may send a configuration information signal to one or more of the UEs 504, 506, . . . , 510 to indicate whether frequency hopping is enabled for at least one of a multicast control channel and/or a multicast traffic channel.

In some configurations, the signal 512 may include at least one of a first hopping indicator indicating whether frequency hopping is enabled for the multicast control channel (e.g., MCCH/SC-MCCH 550) and/or a second hopping indicator indicating whether frequency hopping is enabled for the multicast traffic channel (e.g., one of the MTCHs/SC-MTCHs 552 through 560). The multicast control channel 550 may carry multicast transmissions communicating control information about various multicast services (e.g., available multicast services and the scheduling information of each) and may be associated with the plurality of multicast traffic channels 552, . . . , 560 that may carry multicast transmission communicating the traffic payload for the multicast services. In some configurations, a single bit indicator may be used to indicate whether hopping is enabled for the multicast control channel while multiple single bit hopping indicators may be used to indicate whether hopping is enabled for the plurality of multicast traffic channels, where each single bit hopping indicator indicates whether hopping is enabled for a corresponding multicast traffic channel in the plurality of multicast traffic channels. The MCCH 550 may be the same or similar to the MCCH of drawing 430 of FIG. 4B while the MTCHs 552, . . . , 560 may be the same or similar to the MTCHs of drawing 430 of FIG. 4B.

In some configurations, the frequency hopping activation (ON/OFF) for a multicast control channel (e.g., MCCH/SC-MCCH 550) may be configured by a 1-bit parameter. For example, in some configurations a single bit indicator in the signal 512 may be used to indicate to the UEs that frequency hopping is active/inactive for the multicast control channel 550. In some configurations, the frequency hopping activation (ON/OFF) for multicast traffic channels (e.g., MTCHs/SC-MTCHs) may be indicated by a 1-bit parameter per MTCH. For example, for each multicast traffic channels (e.g., for each of MTCHs 552, . . . , 560), a 1-bit indicator in the signal 512 may be used to indicate whether hopping is active/inactive for the corresponding multicast traffic channel. Thus, in some configurations, for X different multicast traffic channels, X individual 1-bit indicators may be used to indicate whether hopping is active/inactive for the corresponding multicast traffic channels.

In some configurations, the base station 502 may determine/select (528) at least one hopping pattern for multicast service transmissions from the base station 502. For example, the at least one hopping pattern may include a hopping pattern for hopping the multicast control channel and a same or different hopping pattern for hopping the multicast traffic channel. In some configurations, the at least one hopping pattern may be determined based on one or more hopping parameters configured by the base station 502. In some configurations, the hopping parameters include a hopping enable flag/indicator (discussed above), a hopping offset, a number of narrow bands to hop, or a hopping duration. In accordance with an aspect, when frequency hopping is enabled for a multicast control channel and/or one or more multicast traffic channels, in addition to sending the hopping indicators to the UEs 504, 506, . . . , 510 as discussed above, the base station 502 may, in some configurations, include the configured hopping parameters for the at least one hopping pattern in the configuration information signal 512. The UE 504 and/or other UEs interested in receiving multicast service transmissions may use the received information to determine the at least one hopping pattern. In various configurations, the multicast transmissions 520 may be carried by the multicast control channel (e.g., MCCH/SC-MCCH 550), and the multicast transmissions 522 may be carried by a multicast traffic channel (e.g., one of MCCH/SC-MCCH 550), and the multicast control channel and/or traffic channel may be hopped based on the at least one frequency hopping pattern. In one configuration, the multicast transmissions 520 may be SC-PTM transmissions. For example, the multicast transmissions 520 may be SC-MCCH transmissions and the multicast transmissions 522 may be SC-MTCH transmissions.

The UE 504 (and other UEs of the system 500) may receive the configuration information signal 512 and determine (530) based on the hopping indicator(s) whether frequency hopping is enabled for at least one of the multicast control channel or one or more of the multicast traffic channels. The UE 504 may then determine if hopping parameters (that define the at least one hopping pattern for the multicast control and/or traffic channel) are communicated in the signal 512. In some configuration where the hopping parameters may be communicated via the signal 512, the UE 504 may determine (530) the at least one hopping pattern for receiving the multicast transmissions in the multicast control and/or traffic channels. Thus, in some configurations, the hopping parameters for the multicast control and/or traffic channels may be configured by the base station 502 and communicated via the configuration information signal to the UEs 504, 506, . . . , 510.

As discussed earlier, while in some configurations the hopping parameters for the multicast control and/or traffic channels may be configured by the base station 502 and communicated to the UEs, e.g., via RRC signaling, in some other configurations the hopping parameters for the multicast control and/or traffic channels may not be separately configured and rather the hopping parameters for receiving the multicast transmissions 520, 522 may be based on hopping parameters used for hopping one or more other channels. For example, in one such configuration, the hopping parameters for the multicast control and/or traffic channels may be derived by the UEs from information received in a SIB. In such a configuration, the base station 502 may not send hopping parameters in the configuration information signal 512 but does send the hopping indicator(s) to indicate whether hopping is enabled for a multicast control channel and for a multicast traffic channel. When the UE 504 (and other 506, . . . , 510) receiving the signal 512 determines that frequency hopping is enabled for the multicast control channel and/or multicast traffic channel but the hopping parameters are not included, the UE 504 may determine (532) the at least one hopping pattern of the multicast control channel and the multicast traffic channel (for receiving the multicast transmissions in the multicast control and traffic channel) based on the hopping parameters received in the SIB. For example, a SIB (e.g., SIB1) may indicate hopping parameters for a cell specific hopping pattern for receiving one or more SIBs, and the at least one hopping pattern for the multicast control and/or traffic channel may be determined based on the cell specific hopping pattern. For instance, in one particular example, the hopping pattern used for the multicast control channel and multicast traffic channel may be the same as the cell specific hopping pattern which may be used for hopping SIBs.

Thus, in some aspects, the hopping parameters for receiving the multicast control and/or traffic channels may be derived from the hopping parameters configured for SIBs. However, this may not be the case in other aspects where the at least one hopping pattern for receiving the multicast services may be determined based on the hopping parameters configured and communicated by the base station 502 via RRC signaling, e.g., via the signal 512.

As discussed above, in some aspects the hopping parameters may include any of a hopping offset, a number of narrow bands to hop, or a hopping duration. Each of the one or more hopping parameters, e.g., the hopping offset, the number of narrow bands to hop, hopping duration etc., may be defined in reference to a subframe (e.g., an LTE radio subframe). In some aspects the at least one hopping pattern may include one or more hopping patterns.

In some configurations, the same set of hopping parameters can be used for all multicast transmissions, e.g., for the multicast transmissions in both the multicast control channel and the multicast traffic channel. For example, there may be one or more multicast control channels each carrying multicast service related control information and multiple multicast traffic channels each carrying traffic payload corresponding to various different multicast services, and all multicast control channels and traffic channels may be configured using the same set of hopping parameters and thus follow the same hopping pattern. In such a configuration, the UE 504 may determine and use the same, e.g., one single hopping pattern, for receiving both multicast transmissions in the multicast control channel (e.g., multicast transmissions 520) and in multicast traffic channel (e.g., multicast transmissions 522).

In some configurations, one set of parameters for all multicast control channels may be used while another set, e.g., a different set, of parameters may be used for all multicast traffic channels. For example, a first set of hopping parameters (e.g., defining a first hopping pattern) may be configured for all multicast control channels and a second set of hopping parameters (e.g., defining a second hopping pattern) may be configured for all multicast traffic channels. In such a configuration, the UE 504 may determine and use the first hopping pattern for receiving multicast transmissions in the multicast control channels and the second hopping pattern for receiving the multicast transmissions in the multicast traffic channels.

In some other configurations, one set of parameters for all multicast control channels may be configured and a different set of parameters for each multicast traffic channels may be configured by the base station 502. Thus, for example, a multicast control channel (e.g., MCCH 550) may follow a first hopping pattern, and each of the multicast traffic channels (e.g., MTCHs 552, . . . , 560) may follow a different hopping pattern.

In yet another configuration, each multicast control channel of a plurality of multicast control channels may be configured with its own hopping pattern and each of the multicast traffic channels may be configured with its own hopping pattern. In such a configuration, the multicast transmissions in each multicast control channel may be received by the UE 504 based on one of a first plurality of hopping patterns for the multicast control channels, and the multicast transmissions in each multicast traffic channel may be received based on one of a second plurality of different hopping patterns for the multicast traffic channels.

Figure 6:
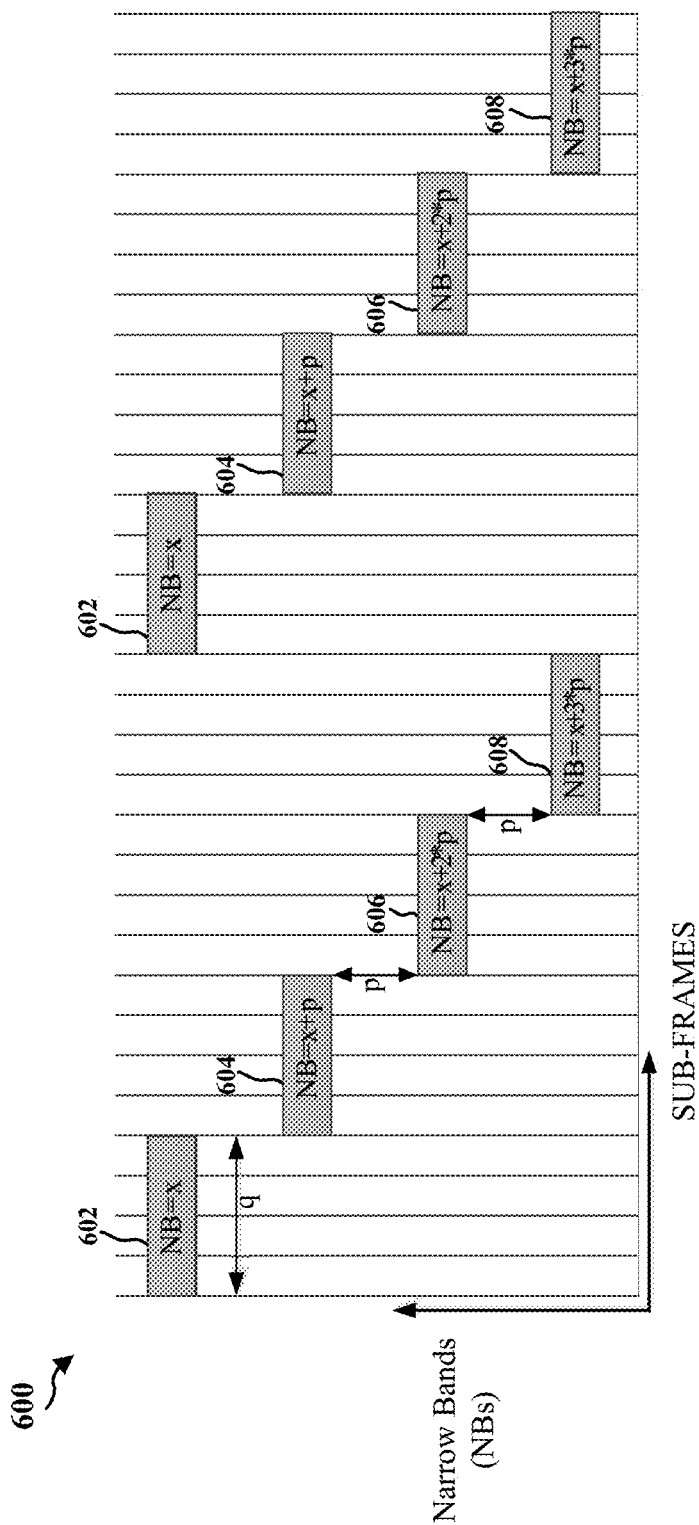
FIG. 6 illustrates an example hopping pattern and various hopping parameters.

FIG. 6 is a drawing illustrating an example hopping pattern 600 and various hopping parameters that may be used to configure (e.g., by the base station 502) and/or determine (e.g., by the UE 504) the hopping pattern. In the illustrated example, the frequency hopping (hopping of narrow bands) across subframes is depicted with the narrow bands (NBs) being represented in the drawing by the rectangles with shading. In accordance with an aspect the narrow bands may be used for broadcast and/or multicast service related transmissions to narrow band devices, e.g., FeMTC and/or IOT types devices. Thus, the NBs illustrated in the drawing may correspond to a multicast control channel or a multicast traffic channel (or a portion of a multicast control or traffic channel).

As discussed supra, a hopping pattern may be based on a number of configured hopping parameters, e.g., which may be configured by the network (e.g., by a network node such as the base station 502). In some configurations, the hopping parameters may include any of a hopping offset, a number of narrow bands to hop, and a hopping duration. In the illustrated example of FIG. 6, one example set of hopping parameters which define the hopping pattern 600 are shown. In FIG. 6, the example hopping offset is indicated by "p", the example hopping duration is indicated by "q", and the example number of narrow bands to hop is indicated by "r". The first transmission NB is illustrated as "x" (e.g., first occurrence of a multicast control or traffic channel that occupies the NB "x"). In FIG. 6, the number of narrow bands to hop (r) is =4. Accordingly, the multicast control/traffic channel can be hopped across the subframes in NBs x (602), x+p (604), x+2*p (606), and x+3*p (608). After the number of narrow bands to hop is reached in accordance with the selected value of "r", the pattern may repeat, as illustrated in the drawing. If a multicast control channel is configured in the NBs, then the multicast transmissions of the control information may be hopped across the subframes (in the hopped NBs) in accordance with the illustrated hopping pattern. Similarly, if a multicast traffic channel is configured in the NBs, then the multicast transmissions of the traffic payload (of multicast services) may be hopped across the subframes (in the hopped NBs) in accordance with the illustrated hopping pattern. In some configurations, the UE 504 may determine the hopping pattern 600 for receiving the multicast transmissions in the NBs and receive the multicast transmissions based on the determined hopping pattern 600. In some configurations, the hopping pattern 600 may be determined by the UE 504 based on configuration information 512 from the base station 502. In some other configurations, the hopping pattern 600 may be based on a cell specific hopping pattern defined by parameters in a SIB received by the UE 504.

Figure 7:
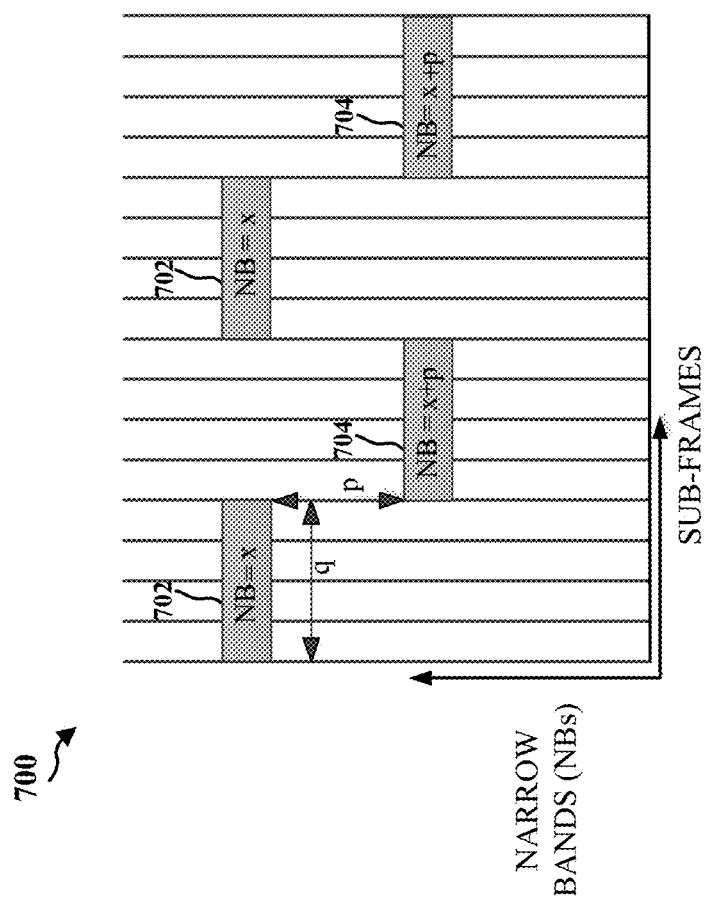
FIG. 7 illustrates another example hopping pattern and various corresponding hopping parameters.

FIG. 7 is a drawing illustrating another example hopping pattern 700 and various hopping parameters. In FIG. 7 example, the values corresponding to one or more hopping parameters (e.g., hopping offset, number of narrow bands to hop, hopping duration) are different as compared to the values of the corresponding parameters shown in FIG. 6, which results in the hopping pattern 700 being different than the hopping pattern 600 as can be appreciated from the two figures.

In the illustrated example of FIG. 7, the number of narrow bands to hop (r)=2. Furthermore, the hopping offset "p" corresponding to the hopping pattern 700 is different (e.g., larger) compared to the value of the hopping offset corresponding to the hopping pattern 600 while the hopping duration "q" is chosen to be the same as for the hopping pattern 600 of FIG. 6. Accordingly, with the hopping pattern 700, a multicast control/traffic channel can be hopped across the subframes in NBs x (702) and x+p (704). After the number of narrow bands to hop is reached in accordance with the selected value of "r" (r=2), the pattern may repeat, as illustrated in the drawing. While two example hopping patterns and corresponding parameters that may be used are shown in FIGS. 6-7 as examples, it should be appreciated that many variations are possible.

Figure 8:
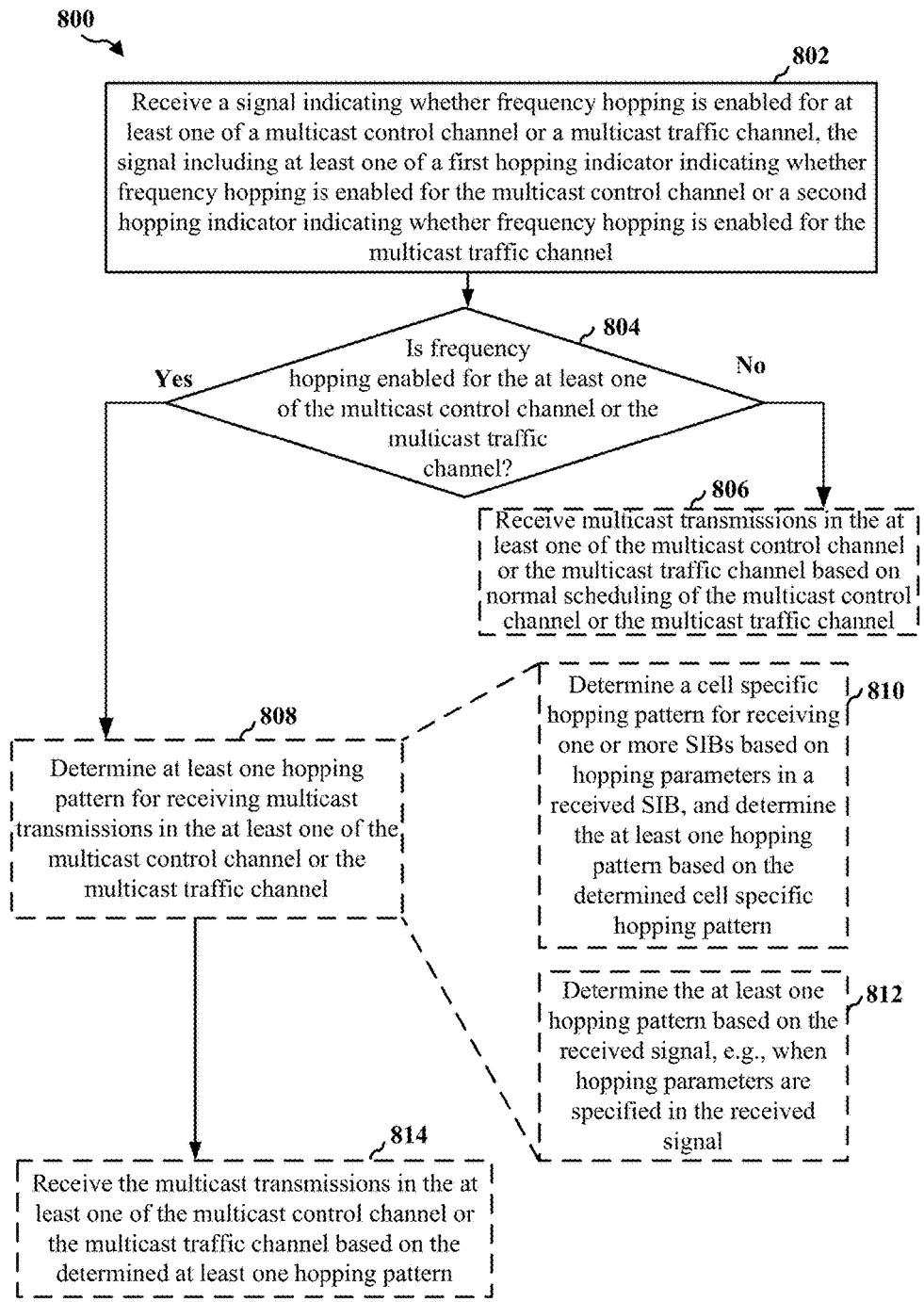
FIG. 8 is a flowchart of a method of wireless communication of a UE in accordance with an example embodiment.

FIG. 8 is a flowchart 800 of an example method of wireless communication in accordance with aspects presented herein. The method may be performed by a UE (e.g., UE 104, 350, 504, 506, 510, 1250, the apparatus 902/902') communicating wirelessly with a base station (e.g., 180, 310, 502, 950, the apparatus 1202, 1202'). Some of the operations may be optional as represented by dashed boxes. At 802, the UE may receive a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. For example with reference to FIG. 5, the UE 504 may receive the configuration information signal 512 from the base station 502 which may include information indicating whether frequency hopping is enabled for one or more multicast channels carrying multicast service transmissions. In some configurations, the received signal includes the first hopping indicator to indicate whether frequency hopping is enabled for the multicast control channel and the second hopping indicator to indicate whether frequency hopping is enabled for the multicast traffic channel. The indicators may also be referred to as hopping enable flags. The indicators may be single bit indicators. For example, setting an indicator/flag corresponding to a multicast control and/or traffic channel to value 1 may indicate that frequency hopping is enabled whereas setting the indicator/flag to 0 may indicate that frequency hopping is not enabled.

In some configurations, the received signal may include an indication of frequency hopping activation for multiple multicast traffic channels which may be associated with a multicast control channel. As discussed earlier, the multicast traffic channels may carry traffic payload corresponding to various multicast services, e.g., various multimedia content services, software updates and/or other services. For example, in some configurations the received signal may include a single bit hopping indicator for each of a plurality of multicast traffic channels (e.g., MTCHs 552, . . . , 560) corresponding to a plurality of multicast services, each single bit hopping indicator indicating whether frequency hopping is enabled for a corresponding multicast traffic channel in the plurality of multicast traffic channels. In some configurations, a set of multicast control channels may be configured for carrying multicast service related control information, while another set of multicast traffic channels may carry traffic payload corresponding to various multicast services. In some such configurations, the received signal may include a first set of 1-bit hopping indicators and a second set of 1-bit hopping indicators, where each 1-bit hopping indicator in the first set indicates whether frequency hopping is enabled for a corresponding multicast control channel of the set of multicast control channels and each 1-bit hopping indicator in the second set indicates whether frequency hopping is enabled for a corresponding multicast traffic channel of the set of multicast traffic channels.

At 804, the UE may determine whether frequency hopping is enabled for the at least one of the multicast control channel or the multicast traffic channel. The determination may be based on the information included in the received signal. For example, based on the signal 512 the UE 504 may determine whether there is an indication of frequency hopping activation for a multicast control channel (e.g., MCCH/SC-MCCH 550) or a multicast traffic channel (e.g., one or more of the MTCHs/SC-MTCH 552, . . . , 560). For instance, in some configurations if an indicator/flag corresponding to the multicast control channel and/or a multicast traffic is set to 1 then the UE may determine that frequency hopping is enabled. In some other configurations, an indicator for a multicast control/traffic channel may be included in the signal only when hopping for the multicast control/traffic channel is activated. If, at 804, it is determined that frequency hopping is not enabled for at least one of the multicast control channel or multicast traffic channel, then at 806 the UE may proceed to receive multicast service related transmissions in the at least one of the multicast control channel or the multicast traffic channel based on normal scheduling (e.g., without hopping) of the multicast control channel or the multicast traffic channel.

If, at 804, it is determined that frequency hopping is enabled for at least one of the multicast control channel or multicast traffic channel, then at 808 the UE determines at least one hopping pattern for receiving multicast transmissions in the at least one of the multicast control channel or the multicast traffic channel. Thus, when the signal 512 indicates that frequency hopping is enabled for the multicast control channel and/or one or more multicast traffic channels, the UE proceeds to determine the hopping pattern(s) configured by the base station to hop the multicast transmissions in the multicast control channels and/or multicast traffic channels. The at least one hopping pattern may include a hopping pattern for hopping a multicast control channel and a same or a different hopping pattern for hopping a multicast traffic channel.

In some configurations, the at least one hopping pattern may be determined based on one or more hopping parameters (e.g., a hopping offset, a number of narrow bands to hop, or a hopping duration discussed above with regard to FIGS. 6-7) configured by the base station 502. In some configurations, the hopping parameters for the at least one hopping pattern may be included in the configuration information signal 512. In some configurations, where the multicast control channel is hopped in accordance with a different hopping pattern than used for hopping one or more multicast traffic channels, the signal 512 may include different sets of hopping parameters for the multicast control and traffic channel. In some other configurations, the hopping parameters for the multicast control and/or traffic channels may not be communicated via the signal 512 and rather determined by the UE from information received in a SIB as discussed in detail with respect to FIG. 5 above. These two approaches for determining the at least one hopping pattern will now be discussed with respect to blocks 810 and 812 which may be used as alternatives.

For example, in some configurations, the hopping parameters that define the at least one hopping pattern are not separately configured for the multicast channels and communicated via the signal 512. Rather, the base station 502 may use hopping pattern(s) used for transmission of other information such as SIBs to hop the multicast transmissions. In such cases, the network may not need to separately communicate the hopping parameters for the hopping pattern(s) for the multicast channels. In some such configurations, at 810, the UE may be configured to determine a cell specific hopping pattern for receiving one or more SIBs based on the hopping parameters included in a SIB received by the UE. The cell specific hopping pattern may be configured by the base station 502 for hopping one or more SIBs (e.g., the one or more SIBS transmitted subsequent to the SIB that includes the hopping parameters) and/or other broadcast channels. Further, at 810, the UE may be configured to use the determined cell specific hopping pattern as the at least one hopping pattern for receiving the multicast transmissions. In some other configurations, where one or more sets of hopping parameters are communicated RRC signaling to the UE (e.g., via the signal 512 and/or additional signal), the UE, at 812, may determine the at least one hopping pattern based on the hopping parameters indicated in the received signal.

In some configurations, the at least one hopping pattern comprises a single hopping pattern used for both the multicast control channel and the multicast traffic channel. For example, with reference to FIG. 5, the multicast control channel (MCCH/SC-MCCH 550) and at least one of the multicast traffic channels (MTCHs/SC-MTCHs 552 through 560) may be configured with the same hopping parameters (and thus have the same hopping pattern). In one configuration, the multicast control channel 550 and all of the multicast traffic channels 552 through 560 may have the same hopping pattern. In some other configurations, the at least one hopping pattern comprises a first hopping pattern for the multicast control channel and a second hopping pattern for the multicast traffic channel. For example, the MCCH/SC-MCCH 550 may follow the first hopping pattern and all of the MTCHs/SC-MTCHs 552 through 560 may follow the second hopping pattern (assuming that hopping is enabled for all of the multicast traffic channels 552 through 560). In some other configurations, the at least one hopping pattern may include a first hopping pattern for the multicast control channel and a second set of hopping patterns for a set of multicast traffic channels. For example, the MCCH/SC-MCCH 550 may follow the first hopping pattern and each multicast traffic channel of the set of multicast traffic channels (e.g., including one or more of the MTCHs/SC-MTCHs 552 through 560) may follow one of a plurality of different hopping patterns of the second set of hopping patterns. In still some other configurations, the at least one hopping pattern may include a first set of hopping patterns for a set of multicast control channels and a second set of hopping patterns for a set of multicast traffic channels. For example, in some configurations there may be a plurality of multicast control channels and a plurality of multicast traffic channels, and each multicast control channel each multicast control channel may have one of a first plurality of different hopping patterns of the first set of hopping patterns and each multicast traffic channel may have one of a second plurality of different hopping patterns of the second set of hopping patterns.

Depending on a given configuration, the UE may use the information received in the signal 512 (e.g., where the hopping parameters for the at least one hopping pattern may be explicitly specified) or the information received in a SIB (e.g., including hopping parameters of a cell specific hopping pattern), to determine the at least one hopping pattern.

Having determined the at least one hopping pattern for receiving the multicast transmissions, the UE may know how the multicast control channels and/or multicast traffic channels carrying the multicast service related transmissions are being hopped. Accordingly, at 814 the UE receives the multicast transmissions in the at least one of the multicast control channel or the multicast traffic channel based on the determined at least one hopping pattern. For instance, consider a simple example of one multicast control channel and one multicast traffic channel where frequency hopping is enabled for both. If both the multicast control channel and the multicast traffic channel are configured with the same hopping parameters (e.g., the determined at least one hopping pattern includes a single hopping pattern for both the multicast control channel and the multicast traffic channel), then the UE receives the multicast transmissions in the multicast control channel and the multicast traffic channel using the determined same hopping pattern. If the determined at least one hopping pattern includes a first hopping pattern for the multicast control channel and a second hopping pattern for the multicast traffic channel, then the UE receives the multicast transmissions in the multicast control channel based on the first hopping pattern and those in the multicast traffic channel based on the second hopping pattern.

In another example, there may be a first set of multicast control channels and a second set of multicast traffic channels and frequency hopping is enabled for all the multicast control and traffic channels. In one configuration, the multicast control channels in the first set (one or more) have the same hopping pattern, e.g., a first hopping pattern while each multicast traffic channel in the second set has a different hopping pattern. In such a case, the determined at least one hopping pattern includes the first hopping pattern for the set of multicast control channels and a second set of hopping patterns for the set of multicast traffic channels. In such a configuration each multicast traffic channel of the set of multicast traffic channels is received based on one of a plurality of different hopping patterns of the second set of hopping patterns. In yet another configuration, each multicast control channel in the first set has its own hopping pattern and each multicast traffic channel in the second set has its own hopping pattern. In such a case the determined at least one hopping pattern includes a first set of hopping patterns for the set of multicast control channels and a second set of hopping patterns for the set of multicast traffic channels. In one such configuration, the UE may receive each multicast control channel of the set of multicast control channels based on one of a first plurality of different hopping patterns of the first set of hopping patterns, and receive each multicast traffic channel of the set of multicast traffic channels based on one of a second plurality of different hopping patterns of the second set of hopping patterns.

Figure 9:
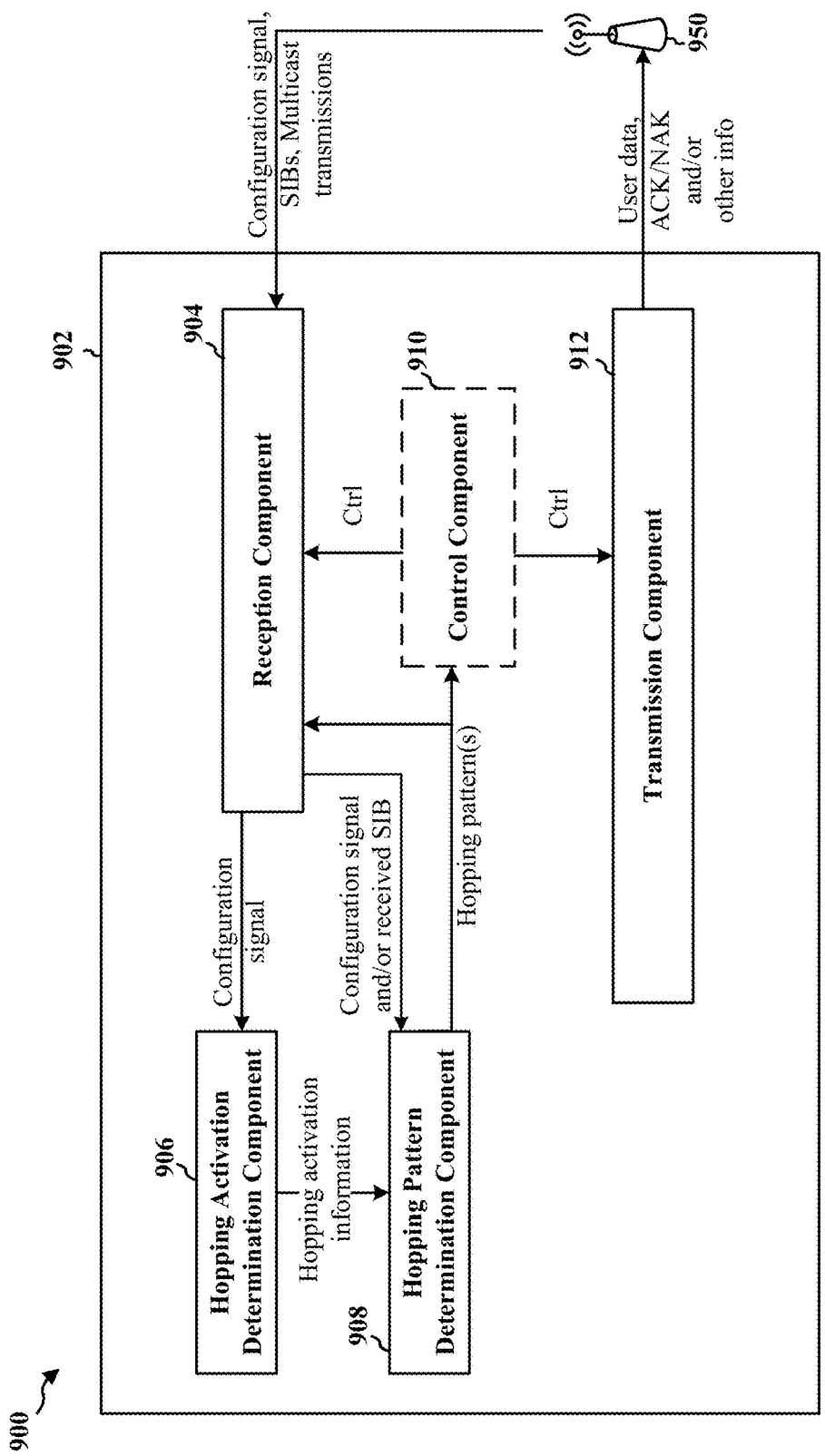
FIG. 9 is a conceptual data flow diagram illustrating the data flow between different means/components in an example apparatus, e.g., a UE.

FIG. 9 is a conceptual data flow diagram 900 illustrating the data flow between different means/components in an example apparatus 902. The apparatus may be a UE (e.g., such as UE 104, 350, 504, 1250, or another UE). For the purpose of discussion, we may consider that the apparatus 902 may be the UE 504 shown in FIG. 5. The apparatus 902 may include a reception component 904, a hopping activation determination component 906, a hopping pattern determination component 908, a control component 910, and a transmission component 912.

The reception component 904 may be configured to receive and process messages and/or other information from other devices such as a base station 950. For example, with reference to FIG. 5, the apparatus 902 may be the UE 504 and the reception component 904 may be configured to receive the configuration signal 512, a SIB, multicast transmissions 520/522, and/or other signals/messages from the base station 502. In some configurations, the reception component 904 may receive a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. For example, with reference to FIG. 5, the apparatus 902 may be the UE 504 and the reception component 904 may receive the configuration signal 512 indicating whether frequency hopping is enabled for at least one of the multicast control channel or the multicast traffic channel. In some configurations, the received signal includes the first hopping indicator to indicate whether frequency hopping is enabled for the multicast control channel and the second hopping indicator to indicate whether frequency hopping is enabled for the multicast traffic channel. In some configurations, the received signal includes a single bit hopping indicator for each of a plurality of multicast traffic channels corresponding to a plurality of multicast services, each single bit hopping indicator indicating whether frequency hopping is enabled for a corresponding multicast traffic channel in the plurality of multicast traffic channels. The signals/information received by the reception component 904 may be processed and provided to one or more other components of the apparatus 902 for possible use in performing the operations discussed with respect to the blocks of flowchart 800.

The hopping activation determination component 906 may be configured to determine whether frequency hopping is enabled for the at least one of the multicast control channel or the multicast traffic channel based on the received signal. For example, with reference to FIG. 5, the activation determination component 906 may process the received configuration signal 512 (e.g., received via the reception component 904) to check the first and/or second indicators and determine whether frequency hopping is enabled for the at least one of the multicast control channel or the multicast traffic channel. The hopping activation determination component 906 may be further configured to provide the determined result as hopping activation information (e.g., indicating for which one or more multicast channels frequency hopping is activated) to the hopping pattern determination component 908 and/or other components of the apparatus 902.

The hopping pattern determination component 908 may be configured to determine at least one hopping pattern for receiving multicast transmissions in the at least one of the multicast control channel or the multicast traffic channel when the frequency hopping is enabled for the at least one of the multicast control channel or the multicast traffic channel. As discussed earlier in detail, in some configurations, the at least one hopping pattern may be determined based on one or more hopping parameters (e.g., a hopping offset, a number of narrow bands to hop, or a hopping duration) configured by the base station 502 and included in the received configuration information signal 512. Thus in some configurations, the hopping pattern determination component 908 may be configured to determine the at least one hopping pattern based on the hopping parameters indicated in the received configuration signal, e.g., signal 512 of FIG. 5. In some other configurations, the hopping parameters for the multicast control and/or traffic channels may be determined based on information received in a SIB, e.g., based on a cell specific hopping pattern. In some such configurations, the hopping pattern determination component 908 may be configured to determine a cell specific hopping pattern for receiving one or more SIBs based on the hopping parameters included in a SIB received by the apparatus 902. In some such configurations, the hopping pattern determination component 908 may be further configured to set the determined cell specific hopping pattern as the at least one hopping pattern for receiving the multicast transmissions in the at least one of the multicast control or multicast traffic channel. In various configurations, information regarding the determined at least one hopping pattern (which may include e.g., one or more hopping patterns) may be provided to the reception component 904 directly and/or to the control component 910 to enable reception of multicast service related transmissions from the base station 950 in accordance with the determined hopping pattern(s). In various configurations, the determined at least one hopping pattern may then be used to receive the multicast transmission in the multicast control and/or traffic channels.

In some configurations, the reception component 904 alone, in combination with and/or under the control of the control component 910 may be configured to receive the multicast transmissions in the at least one of the multicast control channel or the multicast traffic channel based on the determined at least one hopping pattern. For example, in some configurations, the control component 910 may be configured to control the reception component 904 to receive the multicast transmissions in the at least one of the multicast control channel or the multicast traffic channel in accordance with the at least one determined hopping pattern, e.g., by controlling a tuner of the reception component 904 to tune to different hopped frequency bands during different time periods based on a determined hopping pattern. In some configurations, the control component 910 may be implemented within the reception component 904. If both the multicast control channel and the multicast traffic channel are configured with the same hopping parameters, then the reception component 904 may be configured to receive the multicast transmissions in the multicast control channel and the multicast traffic channel using the determined same hopping pattern. If the determined at least one hopping pattern includes different hopping patterns for the multicast control and traffic channels then the reception component 904 may be configured to receive the multicast transmissions in the multicast control and traffic channels based on their corresponding hopping patterns.

The transmission component 912 may be configured to transmit messages to one or more external devices. For example, the transmission component 912 may be configured to transmit user data signal, beacons, ACK/NACK and/or other signals to the base station 950. In some configurations, the control component 910 may be configured to control the transmission schedule and/or transmission timing of one or more signals transmitted by the transmission component 712.

The apparatus may include additional components that perform each of the blocks of the algorithm in the aforementioned flowchart of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
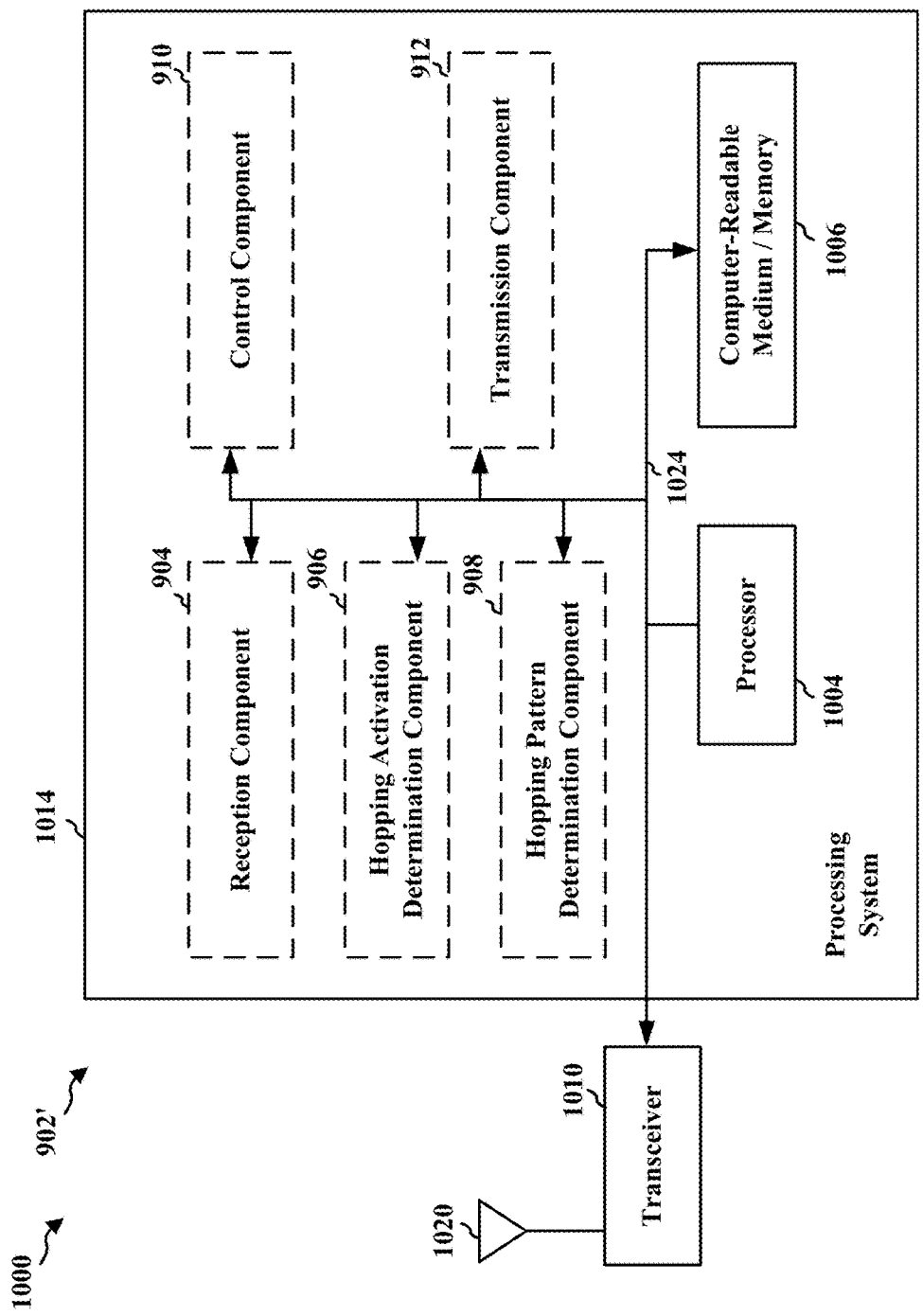
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for means for receiving a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. In some configurations, the apparatus 902/902' may further include means for determining whether frequency hopping is enabled for the at least one of the multicast control channel or the multicast traffic channel based on the received signal.

In some configurations, the apparatus 902/902' may further include means for determining at least one hopping pattern for receiving multicast transmissions in the at least one of the multicast control channel or the multicast traffic channel when the frequency hopping is enabled for the at least one of the multicast control channel or the multicast traffic channel. In some configurations, the means for receiving is further configured to receive the multicast transmissions in the at least one of the multicast control channel or the multicast traffic channel based on the determined at least one hopping pattern. In some configurations, the apparatus 902/902' may further include means for determining a cell specific hopping pattern for receiving one or more SIBs based on hopping parameters in a received SIB. In some such configuration, the at least one hopping pattern for receiving the multicast transmissions in the at least one of the multicast control channel or the multicast traffic channel may be determined based on the determined cell specific hopping pattern. In some other configurations, the at least one hopping pattern for receiving the multicast transmissions in the at least one of the multicast control channel or the multicast traffic channel may be determined based on hopping parameters communicated to the apparatus 902/902' via a configuration signal from the network, e.g., signal 512 from the base station. In some such configurations, the means for determining the at least one hopping pattern may be configured to determine each hopping pattern of the at least one hopping pattern based on the hopping parameters indicated in the received signal including at least one of a hopping offset, a number of narrow bands to hop, or a hopping duration.

In one configuration, the at least one hopping pattern comprises a single hopping pattern used for both the multicast control channels and the multicast traffic channels. In such a configuration, the means for receiving may be configured to receive multicast transmissions of the multicast control and traffic channels based on the same single hopping pattern. In some configurations, the at least one hopping pattern comprises a first hopping pattern for the multicast control channel and a second set of hopping patterns for a set of multicast traffic channels. In some such configurations, the means for receiving may be configured to receive multicast transmission corresponding to each multicast traffic channel of the set of multicast traffic channels based on one of a plurality of different hopping patterns of the second set of hopping patterns. In one configuration, the at least one hopping pattern comprises a first set of hopping patterns for a set of multicast control channels and a second set of hopping patterns for a set of multicast traffic channels. In such a configuration, the means for receiving may be configured to receive multicast transmission corresponding to each multicast control channel of the set of multicast control channels based on one of a first plurality of different hopping patterns of the first set of hopping patterns, and receive multicast transmission corresponding to each multicast traffic channel of the set of multicast traffic channels based on one of a second plurality of different hopping patterns of the second set of hopping patterns.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
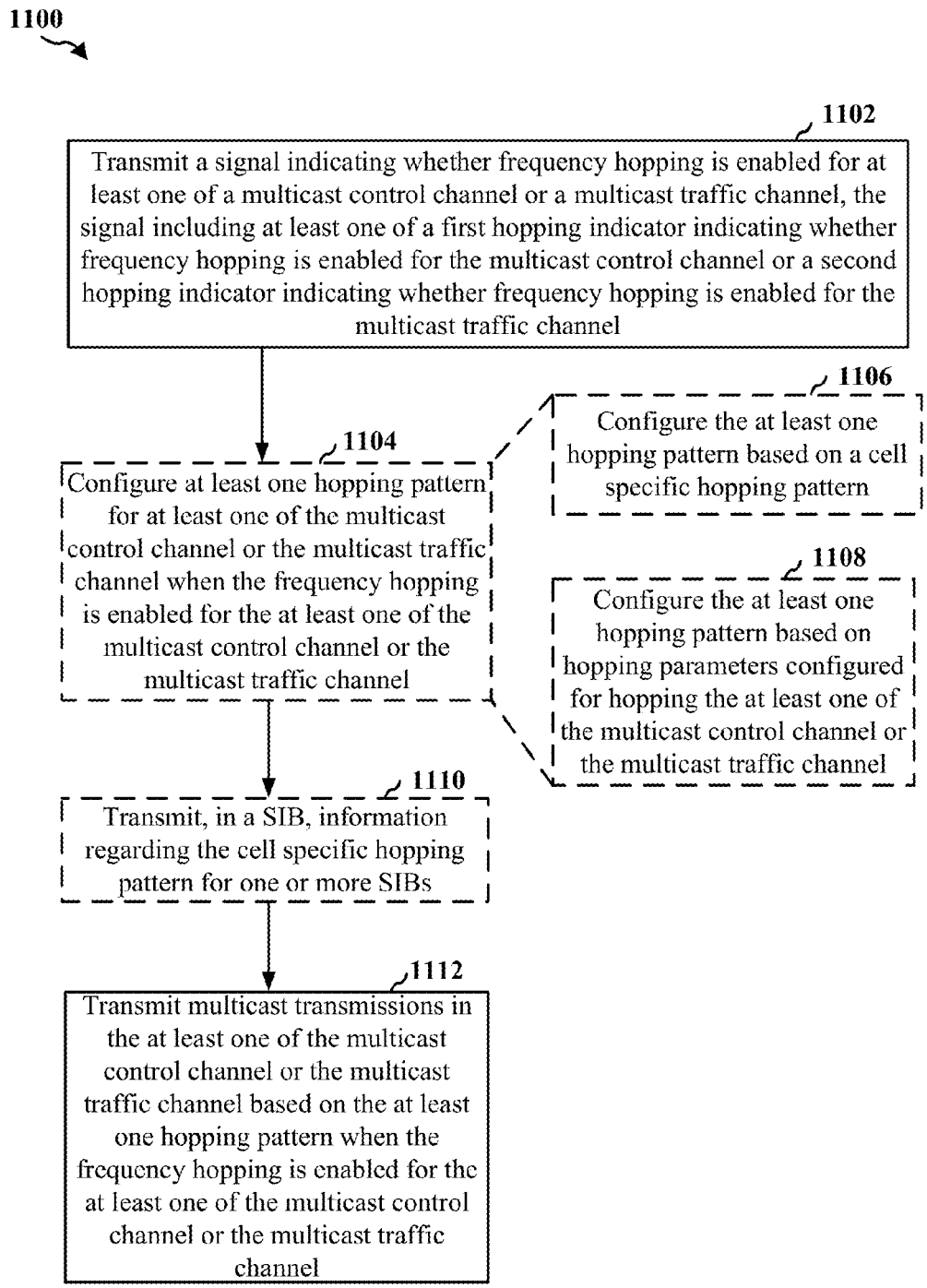
FIG. 11 is a flowchart of a method of wireless communication of a base station in accordance with an example embodiment.

FIG. 11 is a flowchart 1100 of an example method of wireless communication in accordance with aspects presented herein. The method may be performed by a base station (e.g., base station 180, 310, 502, 950, the apparatus 1202, 1202'). Some of the operations may be optional as represented by dashed boxes. At 1102, the base station may transmit a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. For example with reference to FIG. 5, the base station 502 may transmit the configuration information signal 512 which may include information indicating whether frequency hopping is enabled for one or more multicast channels carrying multicast service transmissions. In some configurations, the transmitted signal includes the first hopping indicator to indicate whether frequency hopping is enabled for the multicast control channel and the second hopping indicator to indicate whether frequency hopping is enabled for the multicast traffic channel.

In some configurations, the transmitted signal may include indication of frequency hopping activation for multiple multicast traffic channels which may be associated with a multicast control channel. For example, in some configurations the transmitted signal may include a single bit hopping indicator for each of a plurality of multicast traffic channels (e.g., MTCHs 552, . . . , 560), each single bit hopping indicator indicating whether frequency hopping is enabled for a corresponding multicast traffic channel in the plurality of multicast traffic channels. In some configurations, a set of multicast control channels may be configured for carrying multicast service related control information, while another set of multicast traffic channels may carry traffic payload corresponding to various multicast services. In some such configurations, the transmitted signal may include a first set of 1-bit hopping indicators and a second set of 1-bit hopping indicators, where each 1-bit hopping indicator in the first set indicates whether frequency hopping is enabled for a corresponding multicast control channel of the set of multicast control channels and each 1-bit hopping indicator in the second set indicates whether frequency hopping is enabled for a corresponding multicast traffic channel of the set of multicast traffic channels.

At 1104 the base station may configure at least one hopping pattern for at least one of the multicast control channel or the multicast traffic channel when the frequency hopping is enabled for the at least one of the multicast control channel or the multicast traffic channel (i.e. for the multicast transmission in the multicast control and/or traffic channels). The base station 502 may configure the least one hopping pattern (which may include one or more hopping patterns depending on a given embodiment) following a decision at the base station 502 that frequency hopping is to be deployed for multicast transmission in the at least one of the multicast control channel or multicast traffic channel, e.g., to exploit frequency diversity. In some configurations, the base station may use hopping pattern(s) used for transmission of other information such as SIBs to hop the multicast transmissions. In some such configurations, the base station may use hopping parameters corresponding to a cell specific hopping pattern used for hopping one or more SIBs to configure the at least one hopping pattern for the multicast control and/or traffic channels. Thus, in some configurations at 1106 the base station may configure the at least one hopping pattern for the at least one of the multicast control channel or the multicast traffic channel based on a cell specific hopping pattern as part of the operation at 1104. In some other configurations, the base station may configure the at least one hopping pattern for the at least one of the multicast control channel or the multicast traffic channel based on one or more sets of hopping parameters independently and/or specifically configured for hopping the multicast transmission in the multicast control and traffic channels. In some such configurations, at 1108 the base station may configure the at least one hopping pattern based on hopping parameters selected/configured for hopping the multicast transmissions in the at least one of the multicast control channel or the multicast traffic channel as part of the operation at 1104. Thus, as discussed with reference to blocks 1104, 1106 and 1108, the at least one hopping pattern may be configured by the network in different ways, e.g., based on existing hopping pattern(s) that are used for hopping SIBS (e.g., a cell specific hopping pattern) or based on independently configured hopping parameters for hopping the multicast transmissions, or based on a combination of the two approaches.

At 1110, the base station may transmit, in a SIB, information regarding the cell specific hopping pattern for one or more SIBs. The cell specific hopping pattern may be configured by the base station for hopping one or more SIBs and/or other broadcast channels. The information regarding the cell specific hopping pattern for one or more SIBs may be, e.g., hopping parameters such as a hopping offset, a number of narrow bands to hop, or a hopping duration, that define the cell specific hopping pattern. As discussed above, in some configurations the at least one hopping pattern for transmitting the multicast transmissions in the at least one of the multicast control channel or the multicast traffic channel may be based on the cell specific hopping pattern. In some such configurations, the base station may provide an indication to the UEs interested in multicast service related transmissions to use the cell specific hopping pattern as the at least one the at least one hopping pattern for receiving multicast transmissions in the multicast control and/or traffic channel. In some configurations, the UEs may be preconfigured to determine and use the cell specific hop pattern as the at least one the at least one hopping pattern when the hopping parameters for the at least one hopping pattern are not separately communicated, e.g., via the configuration signal 512 from the base station.

In some configurations, the at least one hopping pattern comprises a single hopping pattern used for both the multicast control channel and the multicast traffic channel. For example, with reference to FIG. 5, the multicast control channel (MCCH/SC-MCCH 550) and at least one of the multicast traffic channels (MTCHs/SC-MTCHs 552 through 560) may be configured with the same hopping parameters (and thus have the same hopping pattern). In some other configurations, the at least one hopping pattern comprises a first hopping pattern for the multicast control channel and a second hopping pattern for the multicast traffic channel. In some other configurations, the at least one hopping pattern may include a first hopping pattern for the multicast control channel and a second set of hopping patterns for a set of multicast traffic channels. In still some other configurations, the at least one hopping pattern may include a first set of hopping patterns for a set of multicast control channels and a second set of hopping patterns for a set of multicast traffic channels.

At 1112, the base station may transmit multicast transmissions in the at least one of the multicast control channel or the multicast traffic channel based on the at least one hopping pattern when the frequency hopping is enabled for the at least one of the multicast control channel or the multicast traffic channel. With reference to FIG. 5, consider an example of one multicast control channel and a plurality of multicast traffic channels where frequency hopping is enabled for all. The base station may indicate to the UEs, e.g., via individual single bit indicators in the configuration signal 512, that frequency hopping is enabled. If the multicast control channel and the multicast traffic channels are configured with the same hopping parameters (e.g., the determined at least one hopping pattern includes a single hopping pattern for both the multicast control channel and the multicast traffic channels), then the base station may transmit the multicast transmissions in the multicast control channel and the multicast traffic channels using the same hopping pattern. If the determined at least one hopping pattern includes a first hopping pattern for the multicast control channel and a second hopping pattern for all the multicast traffic channels, then the base station may send the multicast transmissions in the multicast control channel based on the first hopping pattern and the multicast transmissions in the multicast traffic channels may be in accordance with the second hopping pattern (e.g., same hopping pattern for all multicast traffic channels).

In some configurations, there may be a first set of multicast control channels and a second set of multicast traffic channels and frequency hopping is enabled for all the multicast control and traffic channels. In one such configuration, the multicast control channels in the first set (one or more) have the same hopping pattern, e.g., a first hopping pattern while each multicast traffic channel in the second set has a different hopping pattern. In such a case, the at least one hopping pattern includes the first hopping pattern for the set of multicast control channels and a second set of hopping patterns for the set of multicast traffic channels, and each multicast traffic channel of the set of multicast traffic channels is transmitted based on one of a plurality of different hopping patterns of the second set of hopping patterns. In yet another configuration, each multicast control channel in the first set has its own hopping pattern and each multicast traffic channel in the second set has its own hopping pattern. In such a configuration, the base station may transmit each multicast control channel of the set of multicast control channels based on one of a first plurality of different hopping patterns of the first set of hopping patterns, and transmit each multicast traffic channel of the set of multicast traffic channels based on one of a second plurality of different hopping patterns of the second set of hopping patterns.

Figure 12:
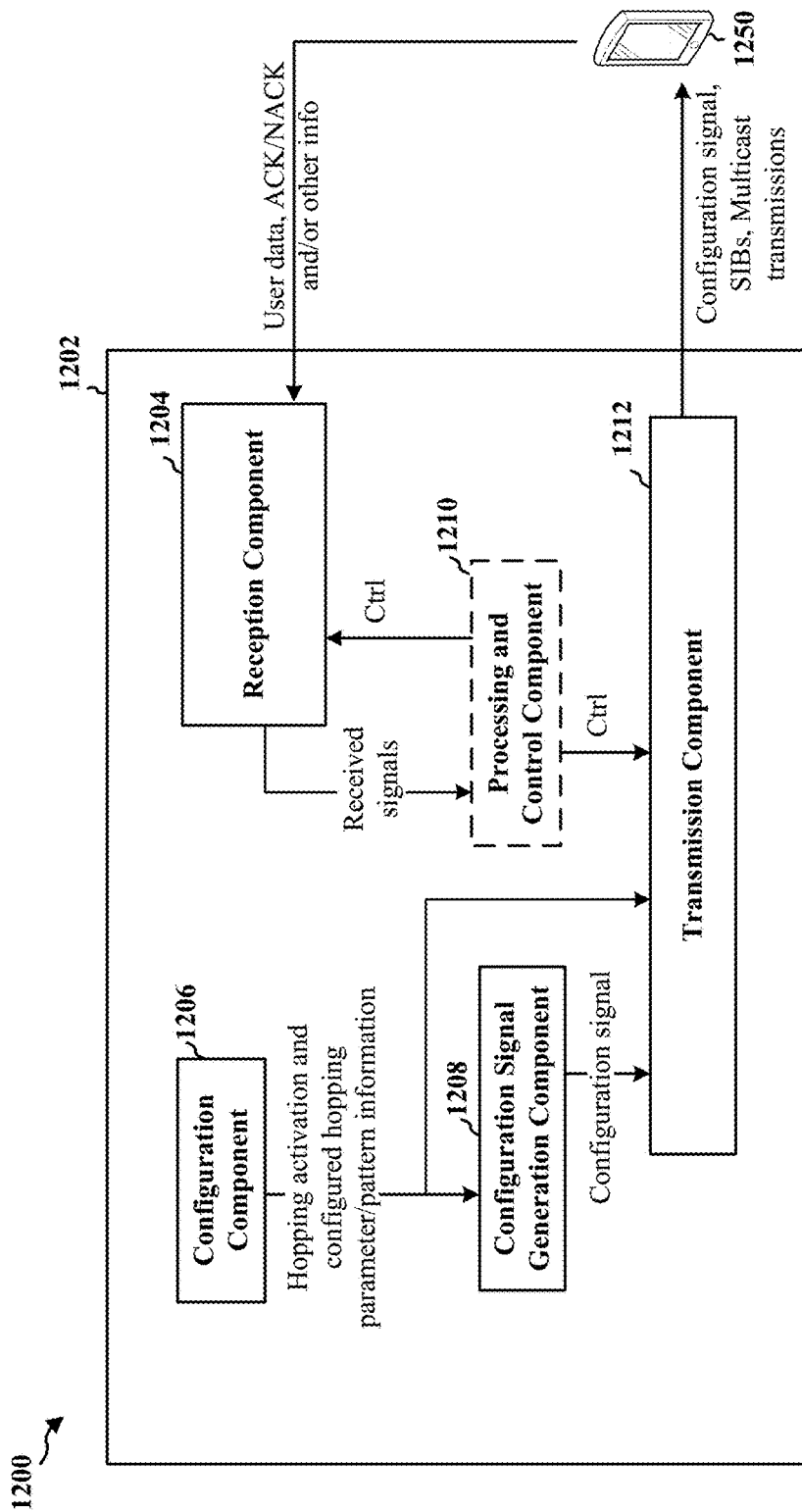
FIG. 12 is a conceptual data flow diagram illustrating the data flow between different means/components in an example apparatus, e.g., a base station.

FIG. 12 is a conceptual data flow diagram 1200 illustrating the data flow between different means/components in an example apparatus 1202. The apparatus may be a base station (e.g., such as base station 180, 310, 502, 950). For the purpose of discussion, we may consider that the apparatus 1202 may correspond to the base station 502 shown in FIG. 5. The apparatus 1202 may include a reception component 1204, a configuration component 1206, a configuration signal generation component 1208, a processing and control component 1210, and a transmission component 1212.

The reception component 1204 may be configured to receive and process messages and/or other information from other devices such as a UE 1250. The signals/information received by the reception component 1204 may be provided to the processing and control component 1210 and/or other components of the apparatus 1202 for further processing and use in performing various operations at the apparatus 1202.

The configuration component 1206 may be configured to decide whether frequency hopping is to be activated/enabled for multicast transmissions in at least one of a multicast control channel or a multicast traffic channel, e.g., to exploit frequency diversity. The configuration component 1206 may configure at least one hopping pattern for the at least one of the multicast control channel or the multicast traffic channel when the frequency hopping is enabled for the at least one of the multicast control channel or the multicast traffic channel. In some configurations, the configuration component 1206 may configure the at least one hopping pattern for the multicast transmissions based on other existing hopping pattern(s) used for transmission of SIBs and/or other broadcast channels. In some such configurations, the configuration component 1206 may configure the at least one hopping pattern based on hopping parameters corresponding to a cell specific hopping pattern used for hopping one or more SIBs. In some other configurations, the configuration component 1206 may configure the at least one hopping pattern for the at least one of the multicast control channel or the multicast traffic channel based on one or more sets of hopping parameters independently and/or specifically configured for hopping the multicast transmission in the multicast control and traffic channels. In such configurations, the configuration component 1206 may select/configure the one or more sets of hopping parameters for hopping the multicast transmissions in the at least one of the multicast control channel or the multicast traffic channel. The configuration information including information regarding hopping activation for multicast control and traffic channels and information regarding the configured hopping parameters/pattern is provided from the configuration component 1206 to the configuration signal generation component 1208 and other components of the apparatus 1202.

The configuration signal generation component 1208 may be configured to generate a configuration signal including information indicating whether frequency hopping is enabled for the at least one of the multicast control channel or the multicast traffic channel, e.g., based on the configuration information from the configuration component 1206. The configuration signal may include at least one of a first hopping indicator indicating whether frequency hopping is enabled for the multicast control channel or a second hopping indicator indicating whether frequency hopping is enabled for the multicast traffic channel. For example, with reference to FIG. 5, the apparatus 1202 may be the base station 502 and the configuration signal 512 may be generated by the configuration signal generation component 1208 for sending to one or more of the UEs 504, 506, . . . , 510. In some configurations, the configuration signal may further include hopping parameters which can be used to determine the at least one hopping pattern configured for the at least one of the multicast control channel or the multicast traffic channel. The configuration signal generated by the configuration signal generation component 1208 may be provided to the transmission component for transmission.

The transmission component 1212 may be configured to transmit messages to one or more external devices, e.g., UE 1250 and other UEs. For example, the transmission component 1212 may be configured to transmit the configuration signal generated by the component 1208 to the UE 1250. In some configurations, the transmitted configuration signal indicates whether frequency hopping is enabled for at least one of the multicast control channel or the multicast traffic channel, and may include at least one of a first hopping indicator indicating whether frequency hopping is enabled for the multicast control channel or a second hopping indicator indicating whether frequency hopping is enabled for the multicast traffic channel. For example, with reference to FIG. 5, the transmitted signal may be configuration signal 512. As discussed earlier, in some configurations, the transmitted signal may include indication of frequency hopping activation for multiple multicast traffic channels which may be associated with a multicast control channel. For example, in some configurations the transmitted signal may include a single bit hopping indicator for each of a plurality of multicast traffic channels, with each single bit hopping indicator indicating whether frequency hopping is enabled for a corresponding multicast traffic channel in the plurality of multicast traffic channels. In some configurations, the transmitted signal may include a first set of 1-bit hopping indicators and a second set of 1-bit hopping indicators, where each 1-bit hopping indicator in the first set indicates whether frequency hopping is enabled for a corresponding multicast control channel of a set of multicast control channels and each 1-bit hopping indicator in the second set indicates whether frequency hopping is enabled for a corresponding multicast traffic channel of a set of multicast traffic channels.

In some configurations, the transmission component 1212 alone, in combination with and/or under the control of the control component 1210, may be further configured to transmit multicast transmissions in the at least one of the multicast control channel or the multicast traffic channel based on the at least one hopping pattern (as selected/configured by the configuration component 1206) when the frequency hopping is enabled for the at least one of the multicast control channel or the multicast traffic channel. The control component 1210 may be configured to control the transmission schedule and/or transmission timing of one or more signals transmitted by the transmission component 1212. In some configurations, the control component 1210 may be implemented within the transmission component 1212. In one configuration where both a multicast control channel and a multicast traffic channel are configured with the same hopping parameters, the transmission component 1212 may be configured to transmit the multicast transmissions in the multicast control channel and the multicast traffic channel using the same hopping pattern. If the configured at least one hopping pattern includes different hopping patterns for the multicast control and traffic channels then the transmission component 1212 may be configured to transmit the multicast transmissions in the multicast control and traffic channels based on their corresponding different hopping patterns.

The apparatus may include additional components that perform each of the blocks of the algorithm in the aforementioned flowchart of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
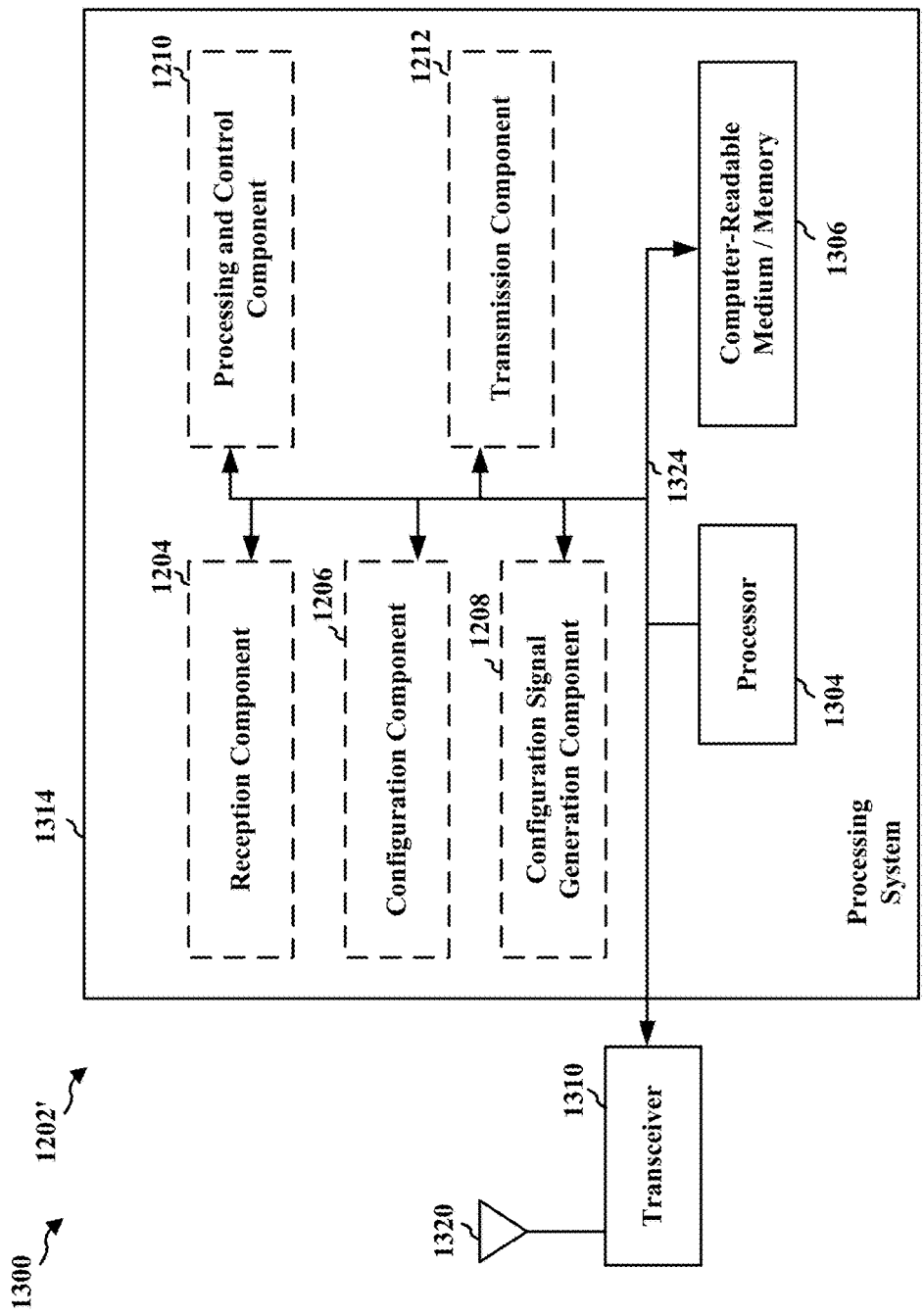
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212.

The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel. In one configuration, the means for transmitting may be further configured to transmit multicast transmissions in the at least one of the multicast control channel or the multicast traffic channel based on at least one hopping pattern when the frequency hopping is enabled for the at least one of the multicast control channel or the multicast traffic channel. In one configuration, the apparatus 1202/1202' may further include means for enabling/activating frequency hopping for multicast transmissions in at least one of a multicast control channel or a multicast traffic channel, and for configuring the at least one hopping pattern for the at least one of the multicast control channel or the multicast traffic channel when the frequency hopping is enabled for the at least one of the multicast control channel or the multicast traffic channel.

In some configurations, the means for transmitting may be further configured to transmit, in a SIB, information regarding a cell specific hopping pattern for one or more SIBs. In some such configurations, the at least one hopping pattern for transmitting the multicast transmissions in the at least one of the multicast control channel or the multicast traffic channel is based on the cell specific hopping pattern.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

An example method of wireless communication of a UE comprises: receiving a signal indicating whether frequency hopping is enabled for at least one of a multicast control channel or a multicast traffic channel, the signal including at least one of a first hopping indicator indicating whether frequency hopping is enabled for the multicast control channel or a second hopping indicator indicating whether frequency hopping is enabled for the multicast traffic channel, and determining whether frequency hopping is enabled for the at least one of the multicast control channel or the multicast traffic channel based on the received signal. In some configurations, the signal includes the first hopping indicator comprising a single bit indicating whether frequency hopping is enabled for the multicast control channel. In some configurations, the signal includes the second hopping indicator comprising a single bit indicating whether frequency hopping is enabled for the multicast traffic channel. In some configurations, the signal includes the first hopping indicator to indicate whether frequency hopping is enabled for the multicast control channel and the second hopping indicator to indicate whether frequency hopping is enabled for the multicast traffic channel. In some configurations, the signal includes a single bit hopping indicator for each of a plurality of multicast traffic channels corresponding to a plurality of multicast services, each single bit hopping indicator indicating whether frequency hopping is enabled for a corresponding multicast traffic channel in the plurality of multicast traffic channels. In some configurations, the signal includes a first set of 1-bit hopping indicators and a second set of 1-bit hopping indicators, each 1-bit hopping indicator in the first set indicating whether frequency hopping is enabled for a corresponding multicast control channel of a set of multicast control channels and each 1-bit hopping indicator in the second set indicating whether frequency hopping is enabled for a corresponding multicast traffic channel of a set of multicast traffic channels.

In one configuration the method further comprises determining at least one hopping pattern for receiving multicast transmissions in the at least one of the multicast control channel or the multicast traffic channel when the frequency hopping is enabled for the at least one of the multicast control channel or the multicast traffic channel, and receiving the multicast transmissions in the at least one of the multicast control channel or the multicast traffic channel based on the determined at least one hopping pattern. In some configurations, the method further comprises determining a cell specific hopping pattern for receiving one or more system information blocks (SIBs) based on hopping parameters in a received SIB, wherein the at least one hopping pattern for receiving the multicast transmissions in the at least one of the multicast control channel or the multicast traffic channel is determined based on the determined cell specific hopping pattern. In some configurations, each hopping pattern of the at least one hopping pattern is determined based on hopping parameters including at least one of a hopping offset, a number of narrow bands to hop, or a hopping duration, which may be communicated in a signal from the base station.

In one configuration, the at least one hopping pattern comprises a single hopping pattern used for both the multicast control channel and the multicast traffic channel. In one configuration, the at least one hopping pattern comprises a first hopping pattern for the multicast control channel and a second hopping pattern for the multicast traffic channel. In one configuration, the at least one hopping pattern comprises a first hopping pattern for the multicast control channel and a second set of hopping patterns for a set of multicast traffic channels, wherein each multicast traffic channel of the set of multicast traffic channels is received based on one of a plurality of different hopping patterns of the second set of hopping patterns. In one configuration, the at least one hopping pattern comprises a first set of hopping patterns for a set of multicast control channels and a second set of hopping patterns for a set of multicast traffic channels, wherein each multicast control channel of the set of multicast control channels is received based on one of a first plurality of different hopping patterns of the first set of hopping patterns and each multicast traffic channel of the set of multicast traffic channels is received based on one of a second plurality of different hopping patterns of the second set of hopping patterns.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving a signal indicating whether frequency hopping is enabled for at least one of a multicast control channel or a multicast traffic channel, the signal including a first hopping indicator indicating whether frequency hopping is enabled for the multicast control channel, and including a hopping indicator for each of a plurality of multicast traffic channels corresponding to a plurality of multicast services, each hopping indicator indicating whether frequency hopping is enabled for a corresponding multicast traffic channel in the plurality of multicast traffic channels; and
   determining whether frequency hopping is enabled for the at least one of the multicast control channel or the multicast traffic channel based on the received signal.

2. The method of claim 1, further comprising:
   determining at least one hopping pattern for receiving multicast transmissions in the at least one of the multicast control channel or the multicast traffic channel when the frequency hopping is enabled for the at least one of the multicast control channel or the multicast traffic channel; and receiving the multicast transmissions in the at least one of the multicast control channel or the multicast traffic channel based on the determined at least one hopping pattern.

3. The method of claim 2, further comprising:

determining a cell specific hopping pattern for receiving one or more system information blocks (SIBs) based on hopping parameters in a received SIB, wherein the at least one hopping pattern for receiving the multicast transmissions in the at least one of the multicast control channel or the multicast traffic channel is determined based on the determined cell specific hopping pattern.

4. The method of claim 2, wherein the at least one hopping pattern comprises a single hopping pattern used for both the multicast control channel and the multicast traffic channel.

5. The method of claim 2, wherein the at least one hopping pattern comprises a first hopping pattern for the multicast control channel and a second hopping pattern for the multicast traffic channel.

6. The method of claim 2, wherein the at least one hopping pattern comprises a first hopping pattern for the multicast control channel and a second set of hopping patterns for a set of multicast traffic channels, wherein each multicast traffic channel of the set of multicast traffic channels is received based on one of a plurality of different hopping patterns of the second set of hopping patterns.

7. The method of claim 2, wherein the at least one hopping pattern comprises a first set of hopping patterns for a set of multicast control channels and a second set of hopping patterns for a set of multicast traffic channels, wherein each multicast control channel of the set of multicast control channels is received based on one of a first plurality of different hopping patterns of the first set of hopping patterns and each multicast traffic channel of the set of multicast traffic channels is received based on one of a second plurality of different hopping patterns of the second set of hopping patterns.

8. The method of claim 2, wherein each hopping pattern of the at least one hopping pattern is determined based on hopping parameters including at least one of a hopping offset, a number of narrow bands to hop, or a hopping duration.

9. An apparatus for wireless communication, comprising:
a memory; and
at least one processor coupled to the memory and configured to:
receiving a signal indicating whether frequency hopping is enabled for at least one of a multicast control channel or a multicast traffic channel, the signal including a first hopping indicator indicating whether frequency hopping is enabled for the multicast control channel, and a hopping indicator for each of a plurality of multicast traffic channels corresponding to a plurality of multicast services, each hopping indicator indicating whether frequency hopping is enabled for a corresponding multicast traffic channel in the plurality of multicast traffic channels; and
determining whether frequency hopping is enabled for the at least one of the multicast control channel or the multicast traffic channel based on the received signal.

10. The apparatus of claim 9, wherein the at least one processor is further configured to:
determine at least one hopping pattern for receiving multicast transmissions in the at least one of the multicast control channel or the multicast traffic channel when the frequency hopping is enabled for the at least one of the multicast control channel or the multicast traffic channel; and
receive the multicast transmissions in the at least one of the multicast control channel or the multicast traffic channel based on the determined at least one hopping pattern.

11. The apparatus of claim 10, wherein the at least one processor is further configured to:
determine a cell specific hopping pattern for receiving one or more system information blocks (SIBs) based on hopping parameters in a received SIB, wherein the at least one hopping pattern for receiving the multicast transmissions in the at least one of the multicast control channel or the multicast traffic channel is determined based on the determined cell specific hopping pattern.

12. A method of wireless communication of a base station, comprising:
transmitting a signal indicating whether frequency hopping is enabled for at least one of a multicast control channel or a multicast traffic channel, the signal including a first hopping indicator indicating whether frequency hopping is enabled for the multicast control channel, and a hopping indicator for each of a plurality of multicast traffic channels corresponding to a plurality of multicast services, each hopping indicator indicating whether frequency hopping is enabled for a corresponding multicast traffic channel in the plurality of multicast traffic channels; and
transmitting multicast transmissions in the at least one of the multicast control channel or the multicast traffic channel based on at least one hopping pattern when the frequency hopping is enabled for the at least one of the multicast control channel or the multicast traffic channel.

13. The method of claim 12, further comprising:
transmitting information regarding a cell specific hopping pattern for one or more system information block (SIBs) in a SIB,
wherein the at least one hopping pattern for transmitting the multicast transmissions in the at least one of the multicast control channel or the multicast traffic channel is based on the cell specific hopping pattern.

14. The method of claim 12, wherein each hopping pattern of the at least one hopping pattern is based on a set of hopping parameters configured by the base station, the set of parameters including one or more of a hopping offset, a number of narrow bands to hop, or a hopping duration, and wherein the signal further includes the set of hopping parameters.

15. The method of claim 12, wherein the at least one hopping pattern comprises a single hopping pattern used for both the multicast control channel and the multicast traffic channel.

16. The method of claim 12, wherein the at least one hopping pattern comprises a first hopping pattern for the multicast control channel and a second hopping pattern for the multicast traffic channel.

17. The method of claim 12, wherein the at least one hopping pattern comprises a first hopping pattern for the multicast control channel and a second set of hopping patterns for a set of multicast traffic channels, and wherein the multicast control channel is transmitted based on the first hopping pattern and each multicast traffic channel of the set of multicast traffic channels is transmitted based on one of a plurality of different hopping patterns of the second set of hopping patterns.

18. The method of claim 12, wherein the at least one hopping pattern comprises a first set of hopping patterns for a set of multicast control channels and a second set of hopping patterns for a set of multicast traffic channels, wherein each multicast control channel of the set of multicast control channels is transmitted based on one of a first plurality of different hopping patterns of the first set of hopping patterns and each multicast traffic channel of the set of multicast traffic channels is transmitted based on one of a second plurality of different hopping patterns of the second set of hopping patterns.

19. An apparatus for wireless communication, comprising:
a memory; and
at least one processor coupled to the memory and configured to:
transmit a signal indicating whether frequency hopping is enabled for at least one of a multicast control channel or a multicast traffic channel, the signal including a first hopping indicator indicating whether frequency hopping is enabled for the multicast control channel, and a hopping indicator for each of a plurality of multicast traffic channels corresponding to a plurality of multicast services, each hopping indicator indicating whether frequency hopping is enabled for a corresponding multicast traffic channel in the plurality of multicast traffic channels; and
transmit multicast transmissions in the at least one of the multicast control channel or the multicast traffic channel based on at least one hopping pattern when the frequency hopping is enabled for the at least one of the multicast control channel or the multicast traffic channel.

20. The apparatus of claim 19, wherein the at least one processor is further configured to transmit information regarding a cell specific hopping pattern for one or more system information block (SIBs) in a SIB, and
wherein the at least one hopping pattern for transmitting the multicast transmissions in the at least one of the multicast control channel or the multicast traffic channel is based on the cell specific hopping pattern.

21. The apparatus of claim 19, wherein the at least one hopping pattern comprises a first hopping pattern for the multicast control channel and a second set of hopping patterns for a set of multicast traffic channels, and wherein the multicast control channel is transmitted based on the first hopping pattern and each multicast traffic channel of the set of multicast traffic channels is transmitted based on one of a plurality of different hopping patterns of the second set of hopping patterns.

22. A method of wireless communication of a user equipment (UE), comprising:
receiving a signal indicating whether frequency hopping is enabled for at least one of a multicast control channel or a multicast traffic channel, the signal including a first set of hopping indicators and a second set of hopping indicators, each hopping indicator in the first set indicating whether frequency hopping is enabled for a corresponding multicast control channel of a set of multicast control channels and each hopping indicator in the second set indicating whether frequency hopping is enabled for a corresponding multicast traffic channel of a set of multicast traffic channels; and
determining whether frequency hopping is enabled for the at least one of the multicast control channel or the multicast traffic channel based on the received signal.

23. A method of wireless communication of a base station, comprising:
transmitting a signal indicating whether frequency hopping is enabled for at least one of a multicast control channel or a multicast traffic channel, the signal including a first set of hopping indicators and a second set of hopping indicators, each hopping indicator in the first set indicating whether frequency hopping is enabled for a corresponding multicast control channel of a set of multicast control channels and each hopping indicator in the second set indicating whether frequency hopping is enabled for a corresponding multicast traffic channel of a set of multicast traffic channels; and
transmitting multicast transmissions in the at least one of the multicast control channel or the multicast traffic channel based on at least one hopping pattern when the frequency hopping is enabled for the at least one of the multicast control channel or the multicast traffic channel.

* * * * *